United States Patent [19]

Osawa et al.

[11] Patent Number: 5,193,081
[45] Date of Patent: Mar. 9, 1993

[54] TRACK-ACCESSING CONTROLLER FOR OPTICAL DISKS

[75] Inventors: Hideaki Osawa; Naobumi Seo, both of Yokohama, Japan

[73] Assignee: Kabushiki Kaisha Toshiba, Kawasaki, Japan

[21] Appl. No.: 486,385

[22] Filed: Feb. 28, 1990

[30] Foreign Application Priority Data

Feb. 28, 1989 [JP] Japan ................................. 1-47256
Sep. 28, 1989 [JP] Japan ................................. 1-250669

[51] Int. Cl.$^5$ .............................................. G11B 7/00
[52] U.S. Cl. ................................ 369/44.26; 369/44.25; 369/44.28; 369/44.34
[58] Field of Search ............... 369/44.13, 44.26, 44.28, 369/44.34, 59

[56] References Cited

U.S. PATENT DOCUMENTS

| | | | |
|---|---|---|---|
| 5,023,855 | 6/1991 | Kobayashi et al. | 369/44.28 |
| 5,063,546 | 11/1991 | Ito et al. | 369/44.28 |
| 5,070,492 | 12/1991 | Ogawa et al. | 369/59 |
| 5,073,880 | 12/1991 | Maeda et al. | 369/44.26 |
| 5,099,467 | 3/1992 | Sumihiro et al. | 369/44.28 |

FOREIGN PATENT DOCUMENTS 58-91536 5/1983 Japan .

Primary Examiner—Donald McElheny, Jr.
Attorney, Agent, or Firm—Oblon, Spivak, McClelland, Maier & Neustadt

[57] ABSTRACT

Disclosed is an optical disk apparatus applied to a data writing/reproducing operation of a sample-servo formatted optical disk having a clock pit and two wobbled pits in each of servo regions. A photodetector receives reflected light of a light beam from the optical disk to produce a reflected light signal. A clock detection unit detects a change in intensity of reflected light components from the clock pit in response to the reflected light signal to produce a binary clock pit detection signal. A tracking error detection unit detects a change in peak intensity of reflected light components from the wobbled pits in each servo region in response to the reflected light signal to produce a binary tracking error signal representing the detected intensity difference. A determination unit is connected to the clock detection unit and the tracking error detection unit. The determination unit compares a phase of a clock pit detection signal with that of a tracking error signal to determine a crossing direction of a beam spot with respect to some of the tracks on the optical disk in accordance with the comparison result of the phases.

13 Claims, 23 Drawing Sheets

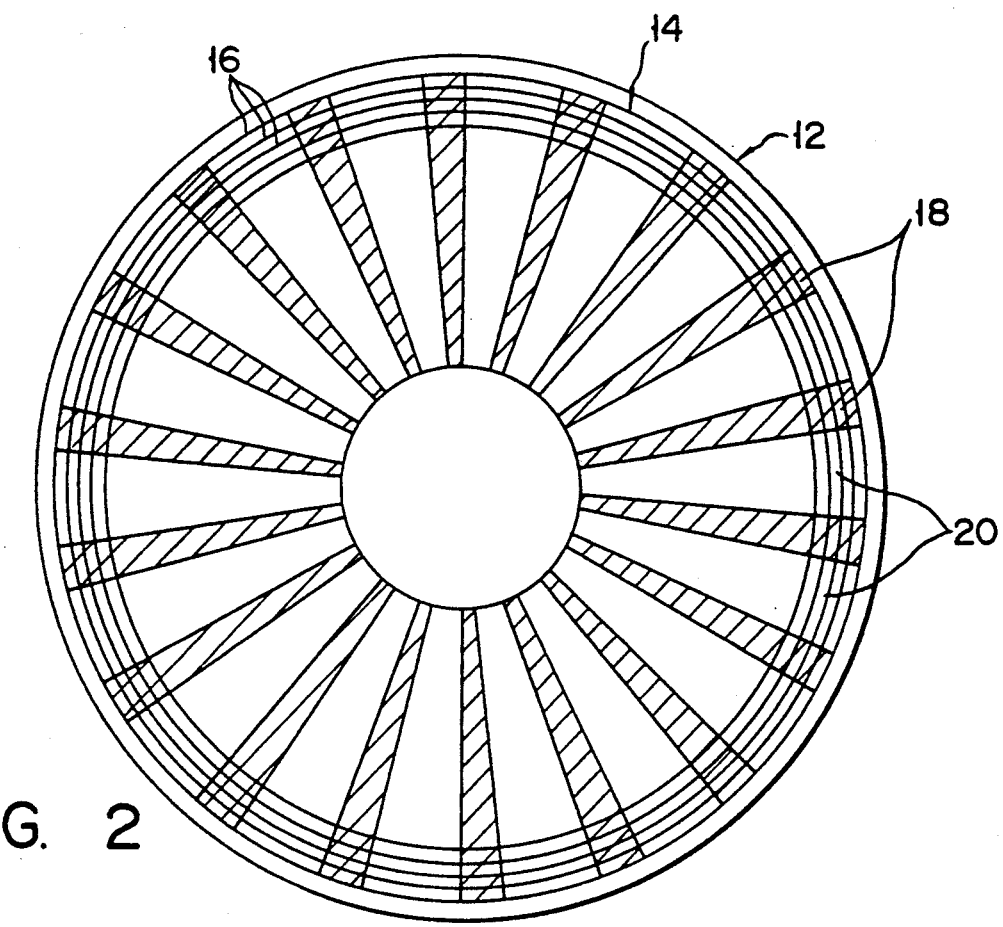
F I G. 2
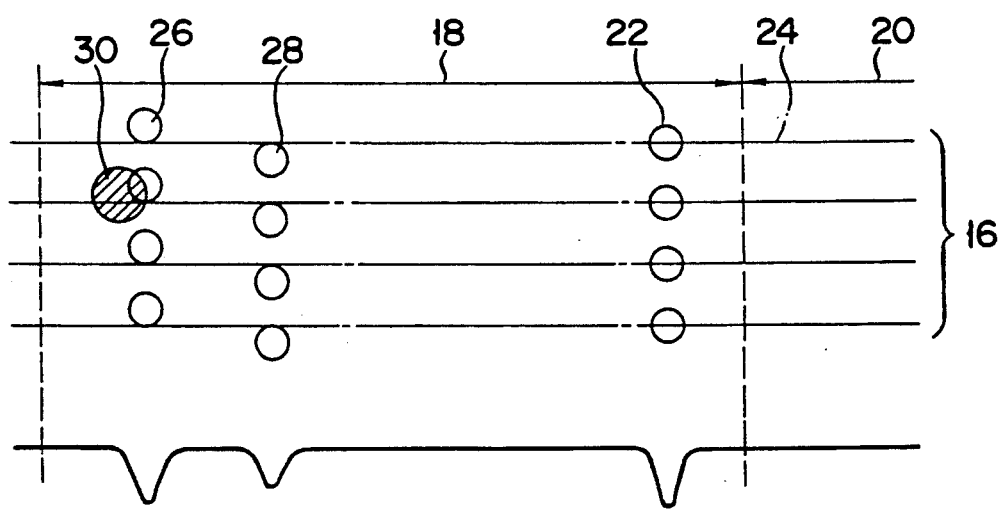
F I G. 3

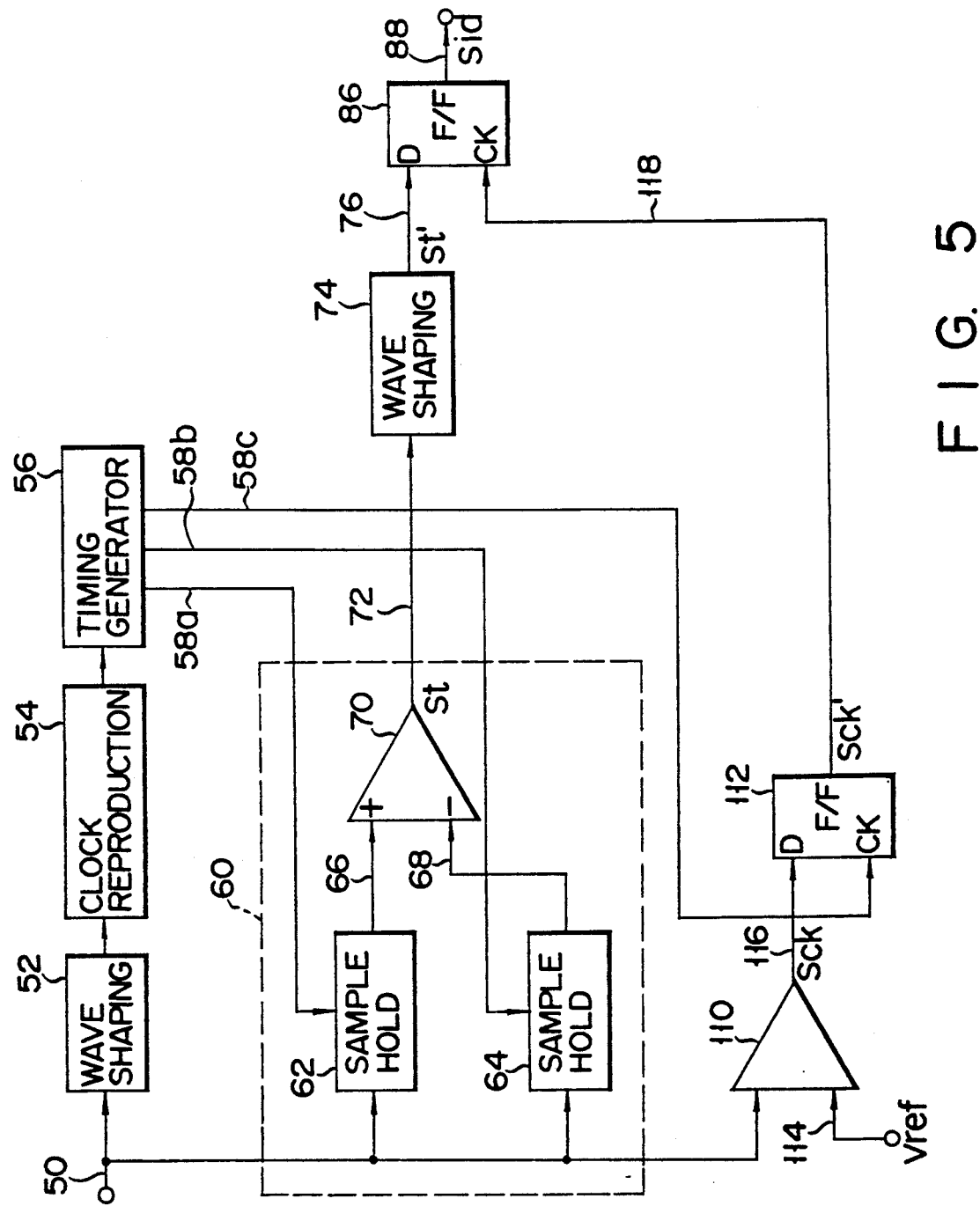
F I G. 5

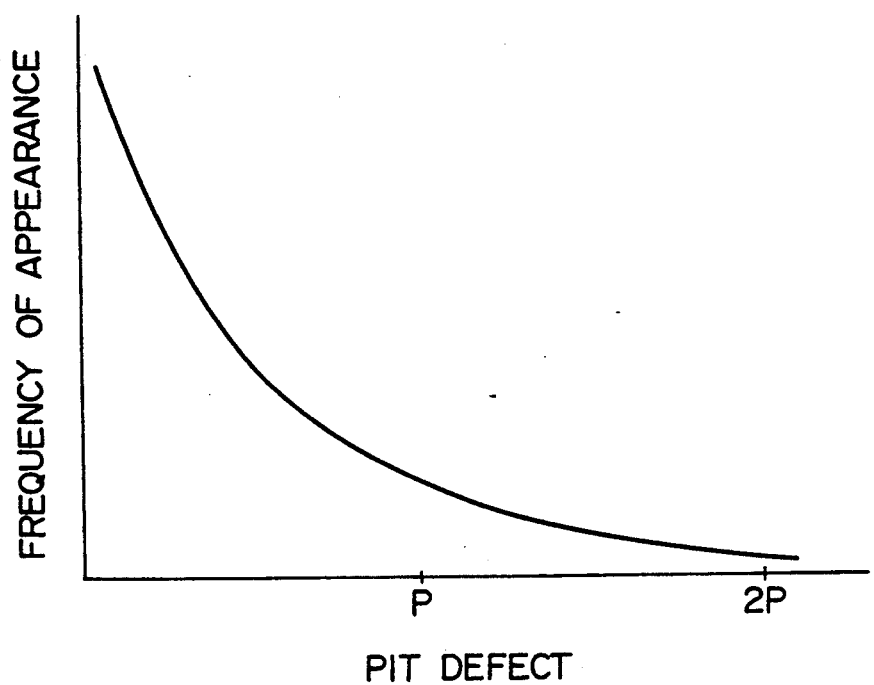
F I G. 12

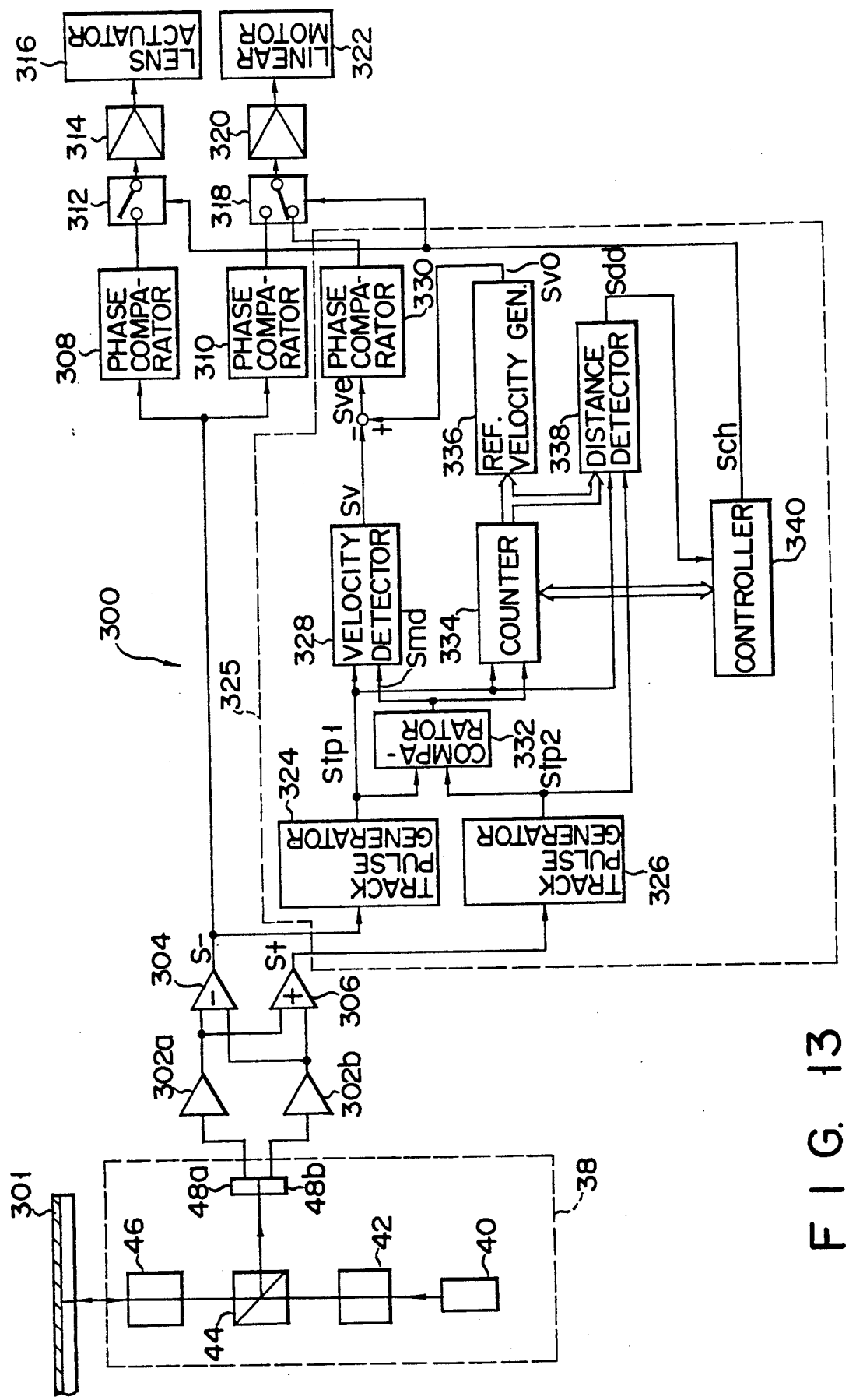
F I G. 13

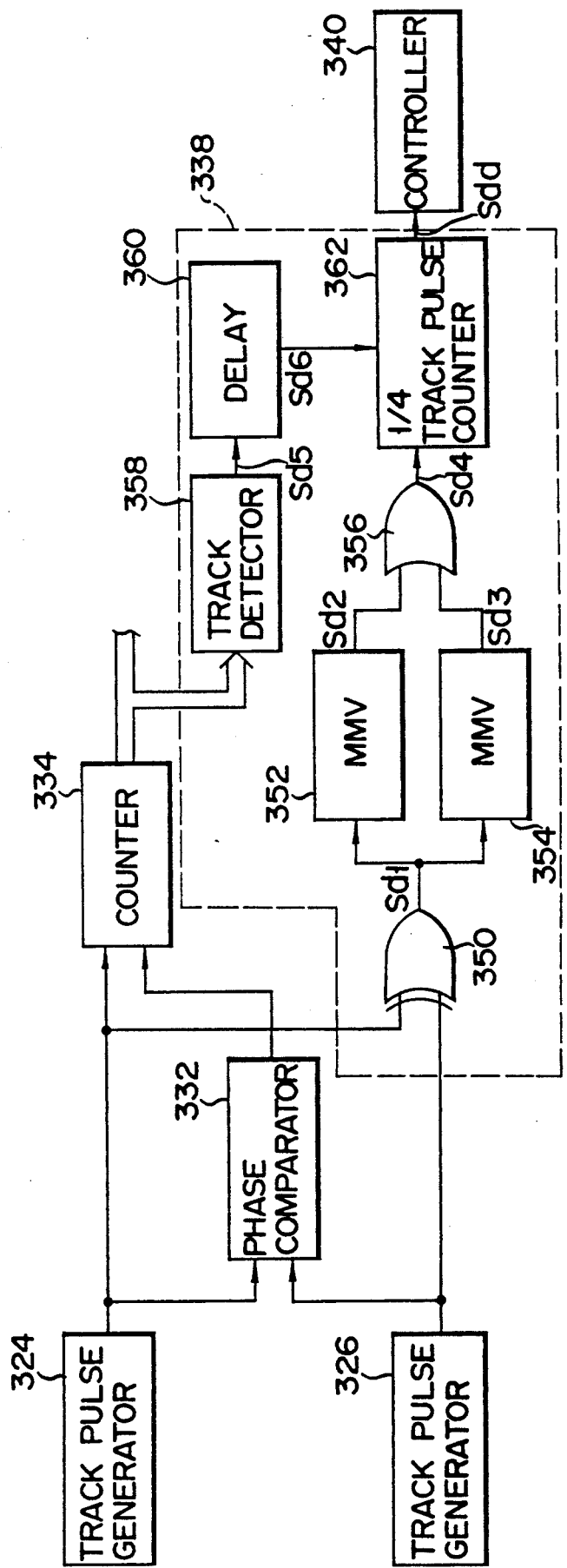
F I G. 15

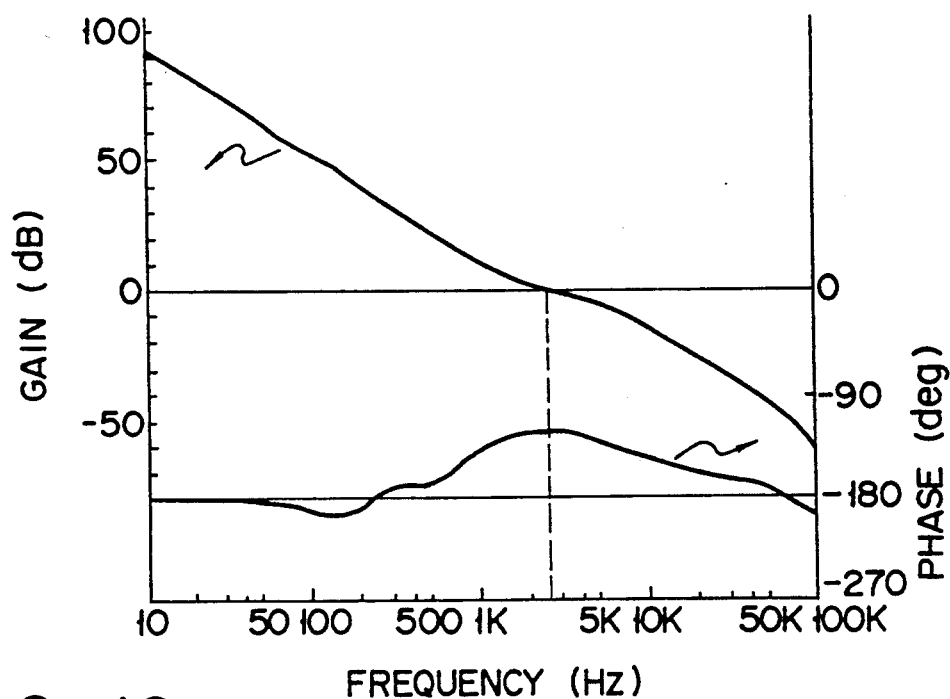
F I G. 19
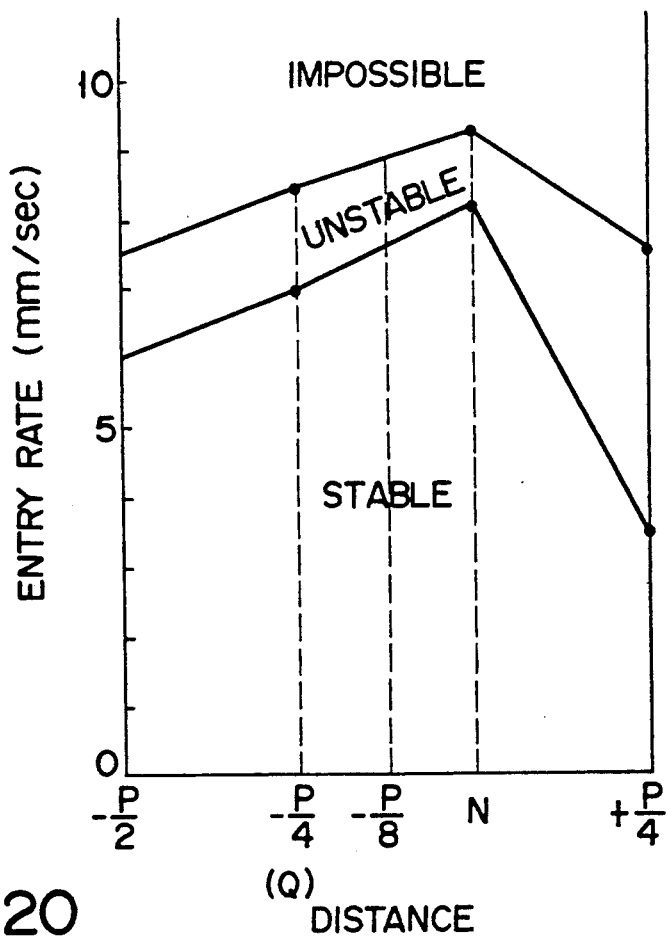
F I G. 20

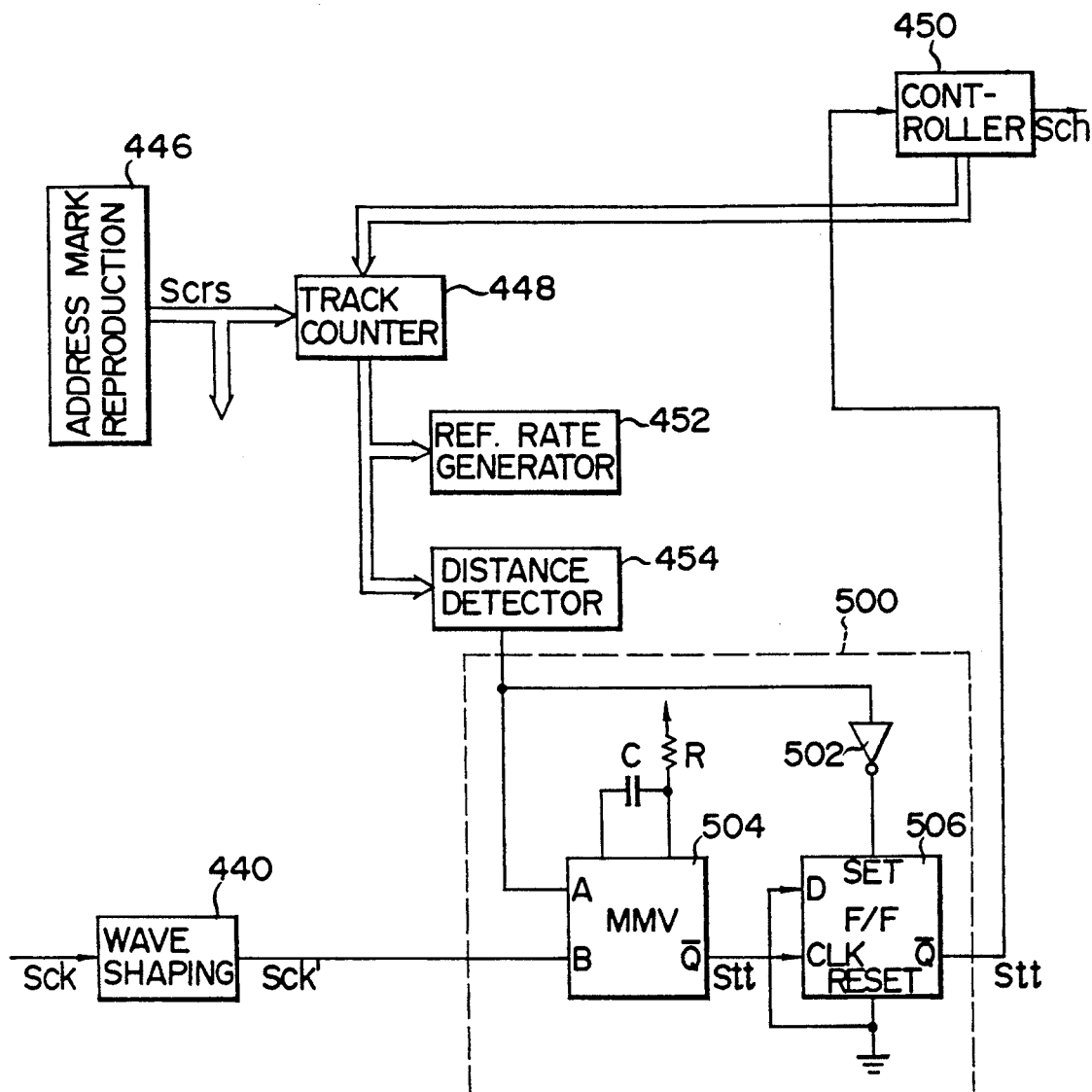
F I G. 26

TRACK-ACCESSING CONTROLLER FOR OPTICAL DISKS

BACKGROUND OF THE INVENTION

1. Field of the Invention

The present invention relates to an optical disk apparatus and, more particularly, to a tracking-servo control technique of a light beam for writing or reading data to or from an optical disk.

2. Description of the Related Art

With the increasing needs for high speed data processing performance of digital systems, optical disk apparatuses have received a great deal of attention as external data storage devices which can store large amounts of data. In recent years, an application range of sample-servo formatted optical disks has been increased in addition to pre-groove optical disks which are conventionally known. Since the sample-servo formatted optical disks do not have a groove for guiding a laser light beam to a track or tracks, higher-density data storage can be advantageously realized.

In order to write or read data to or from an optical disk, high-precision servo control of a laser pickup section of an optical disk apparatus is required so that a spot of a laser light beam focused on the surface of the optical disk accurately traces a track of the optical disk. Otherwise, effective spot energy to the track and/or effective light reflection from the track cannot be obtained, thus degrading efficiency of a writing/reading operation of data.

According to a presently available servo control technique of a laser light beam, servo control pits are typically formed for each track of the sample-servo formatted optical disk. Each pit normally has a circular or elliptic shape smaller than a beam spot. The pits include clock pits, a pit central point of each of which is positioned on the central line of the width of the corresponding circular-shaped track, and first and second pits (to be generally referred to as "wobbled pits") each positioned at the both sides of the corresponding track. These pits are repeatedly formed along the track circumferences in each servo region at preselected intervals.

When a positional relationship between a moving laser beam spot (which may be normally considered as a circle) which is emitted from a pick-up section of the optical disk apparatus and focused on the optical disk surface and these pits is optically detected, a "positional shift" of the spot can be specified. For example, when monitoring of the coincidence between the moving spot and certain clock pits is continued on the basis of the light reflected thereby, it is determined whether the beam spot accurately traces the tracks. In addition, using a difference between components of the light reflected by a pair of wobbled pits, an eccentric shift (or an "undulating" shift) between a locus of the beam spot and the track can be detected. In a principle, when a relative position of the pick-up section with respect to the track is adjusted to compensate for the detected shift, tracking control of the optical disk can be performed in real time.

Such an arrangement, however, has a drawback that the precision of track-accessing control cannot be improved for the following reason: a track-crossing direction of beam spot on the optical disk cannot be detected precisely be only detecting a difference between reflected light components from each pair of wobbled pits. In order to detect the track-crossing direction at high precision, if a specially designed circuit, such as a linear-scale circuit, is provided additionally, the overall circuit configuration will be complicated undesirably.

SUMMARY OF THE INVENTION

It is therefore an object of the present invention to provide a new and improved track access control technique for an optical disk apparatus.

In accordance with the above object, the present invention is addressed to a specific optical disk apparatus which is applied to a rotatable optical disk which is formatted to have a clock pit representing the center of the corresponding track and first and second wobbled pits respectively formed on both sides of the corresponding track to sandwich the central line of the corresponding track therebetween in a selected region of each of the tracks defined thereon. A light-emitting unit emits a light beam to be focused on the optical disk to form a spot. The light-emitting unit is capable of radially moving on the rotating optical disk.

A photodetector unit receives reflected light of the light beam reflected by the optical disk to produce a reflected light signal. The signal represents an intensity of the components of the light reflected by the clock pit and the first and second wobbled pits. A clock detection unit is connected to the photodetector unit. The clock detection unit detects a change in intensity of the components of light reflected by the clock pit in response to the reflected light signal to produce a binary clock pit detection signal. A tracking error detection unit is connected to the photodetector unit. In response to the reflected light signal, the tracking error detection unit detects a change in intensity of the components of the light reflected by the first and second wobbled pits to produce a binary tracking error signal representing the detected intensity difference. A determination unit is connected to the clock detection unit and the tracking error detection unit. The determination unit compares the phase of the clock pit detection signal with that of the tracking error signal to determine a direction in which the beam spot crosses some of the tracks on the optical disk on the basis of the phase comparison result between the signals.

The present invention and its objects and advantages will become more apparent in a detailed description of preferred embodiments presented below.

BRIEF DESCRIPTION OF THE DRAWINGS

In the detailed description of preferred embodiments of the present invention presented below, reference is made to the accompanying drawings of which:

FIG. 2 is a plan view of an entire optical disk used in the embodiment shown in FIG. 1;

FIG. 3 is a plan view of an enlarged main part of the optical disk shown in FIG. 2;

FIG. 5 is a block diagram showing a modification of the circuit arrangement shown in FIG. 1;

FIG. 12 is a graph statistically showing a frequency of appearance of defective pits generated in tracks of an optical disk;

FIG. 13 is a schematic diagram showing a circuit arrangement of a main part of an optical disk apparatus according to the fourth embodiment of the present invention;

FIG. 15 is a block diagram showing an internal arrangement of a distance detection circuit arranged in the track access control section shown in FIG. 13;

FIG. 19 is a Bode diagram of a tracking-servo control system having open-loop characteristics in the embodiment shown in FIG. 13;

FIG. 20 is a graph showing a simulation result of track capture stability in the embodiment;

FIG. 26 is a block diagram showing a modification of the detection circuit shown in FIG. 24.

DETAILED DESCRIPTION OF THE PREFERRED EMBODIMENTS

Figure 1:
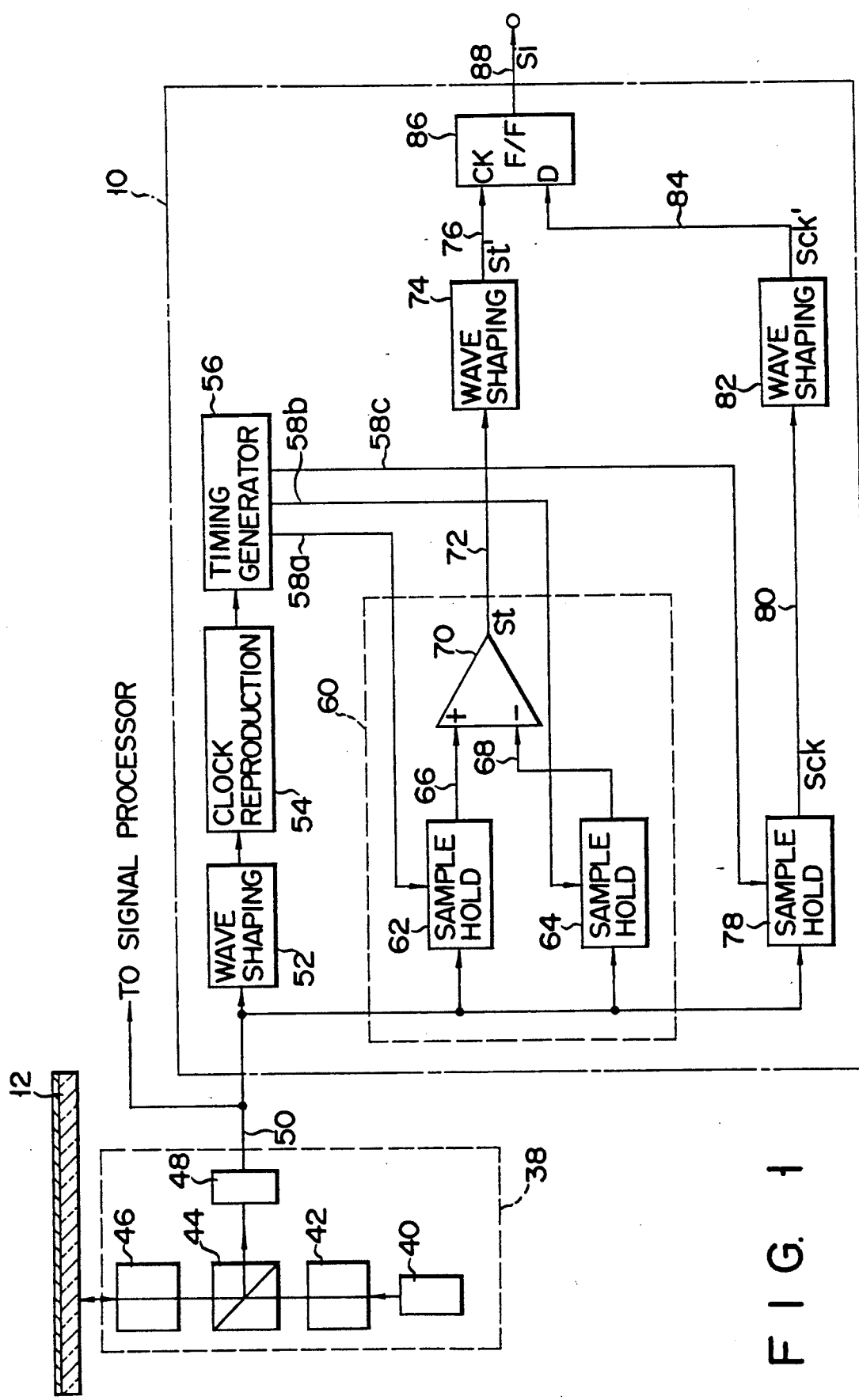
FIG. 1 is a schematic diagram showing a circuit arrangement of a main part of an optical disk apparatus according to a preferred embodiment of the present invention.

In FIG. 1, a track access control section of an optical disk apparatus according to a preferred embodiment of the present invention is generally designated by reference numeral "10". The track access control section 10 is preferably applied to a sample-servo formatted optical disk 12 having no track guiding groove.

As shown in FIG. 2, the sample-servo formatted optical disk 12 has an effective region 14 on its top surface. The effective region 14 has a doughnut-like annular shape. Tracks 16 are formed on the effective region 14 by a large number of concentric circles or one spiral. A selected number of servo regions 18 are radially formed in the effective region 14. The servo regions 18 are arranged on the disk surface at preselected intervals. The remaining parts of the effective region 14, i.e., regions of the large number of tracks 16 except for the servo regions 18 serve as data regions 20.

Referring to FIG. 3, the servo region 18 which overlaps some tracks 16 has a clock pit 22 on a central line 24 of each track. The central point of the clock pit 22 coincides with the corresponding track central line. The servo region 18 has two additional pits 26 and 28. These pits 26 and 28 are formed so that the central line 24 of the corresponding track is positioned therebetween. The distance between each pit and the track central line 24 is ¼ track pitch. In general, these pits 26 and 28 are referred to as "wobbled pits". Each of these pits 22, 26, and 28 has a circular (or elliptic) shape with a diameter smaller than that of a laser beam spot 30 focused on the optical disk surface.

Returning to FIG. 1, an optical head unit 38 is arranged to include a laser beam source 40. The optical head unit 38 is positionally driven by a known actuator (not shown) to be freely and radially movable on the optical disk 12. When data is written in or read out from the optical disk 12 (in a recording or reproduction mode), a laser light beam oscillated from the laser light source 40 is emitted onto the surface of the optical disk 12 as the very small spot 30 through, e.g., a collimate lens 42, a beam splitter 44, and an objective lens 46. In a data reproduction mode, light reflected by the track surface of the optical disk 12 propagates on the above-mentioned optical path in the opposite direction, and is incident on a photodetector 48 through the beam splitter 44. The photodetector 48 generates a reflected light detection signal 50 in response to the incident light beam.

The reflected light detection signal 50 is supplied to a known reproduction signal processing circuit section (not shown), and is also supplied to the track access control section 10, which determines a track-crossing direction (i.e., whether the beam spot 30 crosses the track inwardly or outwardly) of the light beam spot 30 which moves on the optical disk 12. The track access control section 10 includes a wave shaping circuit 52, to which the reflected signal 50 is supplied. The wave shaping circuit 52 converts the reflected signal 50 into a binary signal. The binary reflected signal is supplied to a clock reproduction circuit 54. The clock reproduction circuit 54 reproduces a reference clock signal based on the clock pits 22 in the servo regions on the optical disk 12. The clock signal is supplied to a timing generation circuit 56. In response to the clock signal, the timing generator 56 generates timing signals 58a, 58b, and 58c to detect peak values of the reflected light signals from the clock pit 22 and the first and second wobbled pits 26 and 28 of each of the servo regions 18 of the optical disk 12.

As shown in FIG. 1, the track access control section 10 includes a servo error detection circuit 60, which has two sample hold circuits 62 and 64 which receive the reflected signal 50. The sample hold circuits 62 and 64 detect peak value levels of the reflected light signals from the first and second wobbled pits 26 and 28 in each servo region 18 of the optical disk 12 to generate peak value detection signals 66 and 68. The peak value detection signals 66 and 68 are supplied to non-inverting and inverting inputs of a differential amplifier 70, respectively. The differential amplifier 70 calculates a difference between the peak value detection signals 66 and 68. Therefore, an output signal 72 from the differential amplifier 70 serves as a tracking error signal St representing a trace error with respect to the track corresponding to the beam spot 30 on the optical disk 12. The signal St is supplied to a wave shaping circuit 74, and is converted into a binary signal 76 serving as a tracking error signal St' which is binarized by the circuit 74.

The track access control section 10 includes another sample hold circuit 78, which also receives the reflected light signal 50. In response to the timing signal 58c, the sample hold circuit 78 detects peak value levels of the reflected light signal from the clock pit 22 in each servo region 18 of the optical disk 12 to generate a peak value detection signal 80. The peak value detection signal 80 serves as a clock pit intensity change signal Sck representing a detected change in intensity of the reflected light of the beam spot 30 on the optical disk 12 from each of the clock pits. The signal Sck is supplied to a wave shaping circuit 82, and is binarized by the circuit 82, thereby obtaining a binary signal 84 serving as a binary clock pit detection signal Sck'.

The binary tracking error signal 76 and the binary clock pit detection signal 84 are supplied to a clock input CK and a D input of a D-type flip-flop circuit 86, respectively. For example, the flip-flop 86 sequentially detects a logic level of the clock pit detection signal 84 in synchronism with leading edges of the signal waveforms of the tracking error signal 76 input thereto, thus outputting a logic level detection signal 88. The output signal 88 from the flip-flop 86, therefore, acts as a track-crossing direction determination signal Sid representing a determination result of a track-crossing direction of the beam spot 30 which is trying to trace the track 16 on the optical disk 12 with respect to the track.

Figure 4:
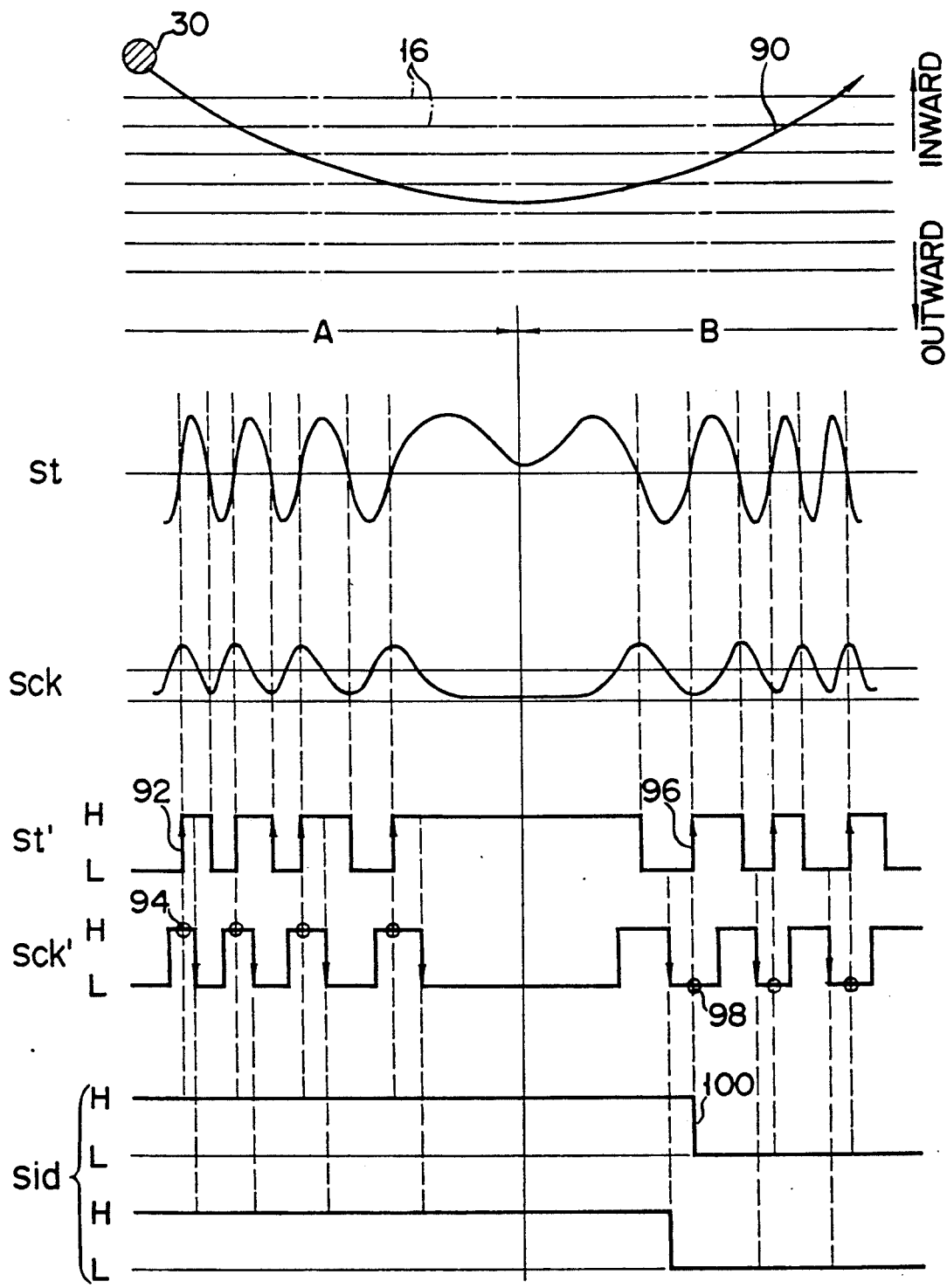
FIG. 4 is a diagram showing waveforms of main signals generated in main parts of a track access control section shown in FIG. 1 in the same time scale.

An operation of the circuit arrangement shown in FIG. 1 will be described hereinafter with reference to FIG. 4. FIG. 4 shows a plan arrangement of a main part of the optical disk 12 which is similar to that shown in FIG. 3 in a top part thereof, wherein an inappropriate tracking operation state in which the beam spot 30 simultaneously traces some tracks 16 is exemplified. Such an incorrect tracking movement of the beam spot 30 is indicated by an arrow "90". A first half of the arrow 90 belongs to a period A in which the beam spot 30 is shifted from the inner periphery to the outer periphery of the optical disk 12; and the second half of the arrow 90 belongs to a period B in which the beam spot 30, on the contrary, is shifted from the outer periphery to the inner periphery of the optical disk 12. The waveforms of the main circuits of the track access control section 10 generated during these periods A and B are apparently shown in the remaining area of FIG. 4.

For example, the waveform pattern of the tracking error signal St during the period A is obtained when the optical disk 12 has eccentricity, and track access and tracking control are performed with respect to the eccentric optical disk. In particular, this waveform pattern tends to appear when a velocity of the shift movement of the optical disk due to eccentricity is substantially equal to a velocity of a linear motor (not shown in FIG. 1) in an actuator (not visible in FIG. 1) for position-driving the optical head unit 38 which oscillates a laser beam. In particular, the track-accessing control technique according to the present invention is effective when correction of the eccentricity based on determination of a track-crossing direction of the beam spot is performed under the above conditions.

In the flip-flop 86, for example, a logic level 94 of the binary clock pit detection signal Sck' is detected in synchronism with the generation timing of leading edges 92 of the binary tracking error signal St'. If "H" level is detected, the track-crossing direction determination signal Sid goes to "H" level, as shown in FIG. 4. This means that the beam spot 30 outwardly crosses a certain target track 16 (track shift occurs in the radial direction of the disk). Therefore, the track-crossing direction determination signal Sid holds "H" level during the period A. During the period B, if the binary clock pit detection signal Sck' is set at "L" level at a certain leading edge 96 of the binary tracking error signal St', as designated by reference numeral "98", the clock pit detection signal Sck' changes from "H" level to "L" level, as designated by reference numeral "100". This fact means that the beam spot 30 is track-shifted in a manner to inwardly cross the certain target track 16. Therefore, the trackcrossing direction determination signal Sid holds "H" level during the period B.

An example of another track-crossing direction determination signal Sid is shown in the lowermost area of FIG. 4. This track-crossing direction determination signal Sid has a waveform obtained when a logic level of the binary tracking error signal St' is detected in synchronism with the generation timing of trailing edges of the binary clock pit detection signal Sck'. Regardless of the detection mode, the resultant trackcrossing direction determination signal Sid can act as a determination signal which is effective to determine a track-crossing direction.

According to this embodiment, a track-shift direction (i.e., a track-crossing direction) of the beam spot 30 with respect to the target track 16 can be quickly and accurately detected utilizing the clock pit 22 and the first and second wobbled pits 26 and 28 conventionally arranged on the sample-servo formatted optical disk 12. More specifically, the tracking error signal St is determined on the basis of the intensity difference of the reflected light components of the laser beam spot 30 from the first and second wobbled pits 26 and 28 in each servo region 18 of the optical disk 12. The binary signal St' obtained from the signal St is phase-compared with the binary signal Sck' obtained from the clock pit detection signal Sck. Therefore, the track-crossing direction of the beam spot 30 can be easily discriminated in accordance with the comparison result. At this time, a complicated circuit arrangement is not required at all. The discrimination result is immediately fed back to track-accessing control, thereby providing effective track-accessing control.

The above-mentioned track access control section 10 may be modified, as shown in FIG. 5, wherein a level comparator 110 and a flip-flop circuit 112 are arranged in place of the series connection of the sample hold circuit 78 and the wave shaping circuit 82 in FIG. 1. Since the other arrangements are the same as those shown in FIG. 1, the same reference numerals in FIG.

5 denote the same parts as in FIG. 1, and a detailed description thereof will be omitted.

More specifically, the comparator 110 receives the reflected light signal 50 at the first input thereof, and receives a reference signal 114 having a reference voltage Vref at the second input thereof. The comparator 110 compares the reflected light signal 50 with the reference signal 114 to output a binary comparison result signal 116 having "H" or "L" level. The comparison result signal 116 is supplied to a D input of the flip-flop 112. The flip-flop 112 receives the timing signal 58c from the timing generator 56 at a clock input thereof. The flip-flop 112 continuously detects a logic value of the signal level of the comparison result signal 116 in response to the timing signal 58c. An output signal 118 from the flip-flop 112 is supplied to the clock input of the flip-flop 86 as the above-mentioned clock pit detection signal Sck'. With such an arrangement, the same effect as in the above embodiment can be obtained.

Figure 6:
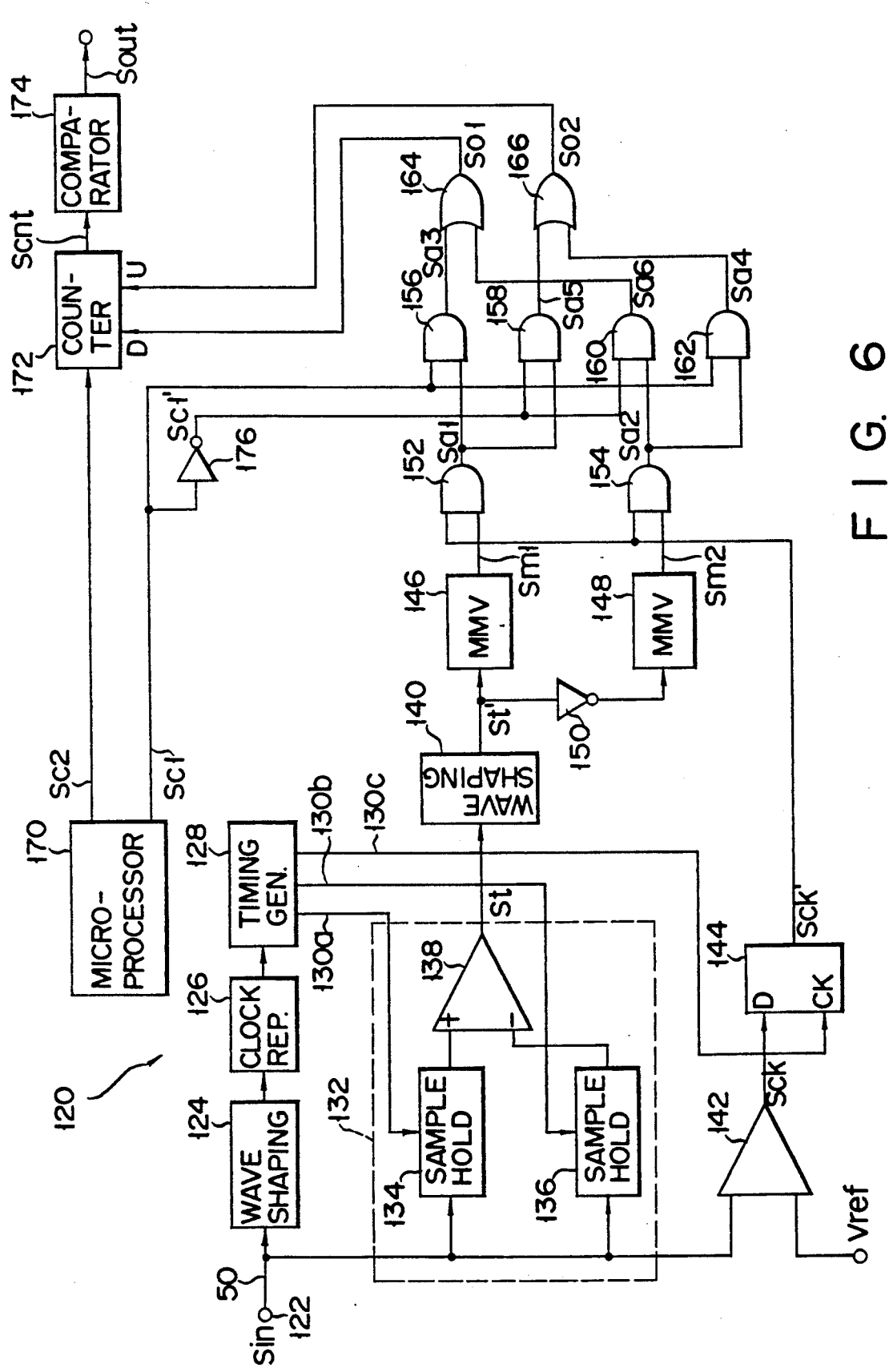
FIG. 6 is a schematic diagram showing a circuit arrangement of a main part of an optical disk apparatus according to another embodiment of the present invention.

Referring now to FIG. 6, a track access control section of an optical disk apparatus according to the second embodiment of the present invention is generally designated by reference numeral "120". The track access control section 120 has an input 122 to which a reflected light signal 50 is externally supplied. The signal 50 (to be often referred to as an input signal Sin hereinafter) is supplied through a wave shaping circuit 124 and a clock reproduction circuit 126 to a timing generation circuit 128, which generates timing signals 130a, 130b, and 130c. These timing signals are often designated by "Stmg" hereinafter.

A servo error detection circuit 132 includes sample hold circuits 134 and 136. These sample hold circuits receive the timing signals 130a and 130b, respectively. Output signals from the sample hold circuits 134 and 136 are supplied to a differential amplifier 138. An output signal from the differential amplifier 138 is supplied to a wave shaping circuit 140 as a tracking error signal St. The wave shaping circuit 140 generates a binary tracking error signal St'. An arrangement required to generate such a tracking error signal is the same as those in the above embodiments.

The reflected light signal 50 is also supplied to a level comparator 142, which is connected to a D input of a D-type flip-flop circuit 144. The flip-flop 144 receives the timing signal 130c at a clock input thereof. The flip-flop 144 generates a binary clock pit detection signal Sck'. An arrangement and an operation of the components 142 and 144 are substantially the same as those shown in FIG. 5, and a description thereof will be omitted.

The binary tracking error signal St' generated by the wave shaping circuit 140 is supplied to a first monostable multivibrator 146. At the same time, the signal St' is supplied to a second monostable multivibrator 148 through an inverter 150. Six AND gates 152, 154, 156, 158, 160, and 162 and two OR gates 164 and 166 are connected to the output stages of the monostable multivibrators 146 and 148, as shown in FIG. 6. A microprocessor 170 is provided to have an output connected to an up/down counter 172 and a comparator 174. The counter 172 receives output signals from the OR gates 164 and 166. The microprocessor 170 includes another output directly connected to the first inputs of certain AND gates 156 and 162 positioned at the ends of the four parallel-connected AND gates 156, 158, 160, and 162. This output is connected to the first inputs of the remaining two AND gates 158 and 160 of the above-mentioned four parallel-connected AND gates through an inverter 176. An output of the AND gate 152 is connected to the second inputs of the AND gates 156 and 158; and an output of the AND gate 154 is connected to the second inputs of the AND gates 160 and 162.

The first monostable multivibrator 146 detects generation of leading edges of the signal waveform of the tracking error signal St' to generate a leading edge detection signal Sm1. The second monostable multivibrator 148 detects generation of trailing edges of the signal waveform of the tracking error signal St' in response to the inverted tracking error signal St' to generate a trailing edge detection signal Sm2. The AND gate 152 calculates a logical product of the signals Sm1 and Sck' to produce an output signal Sa1. The output signal Sa1, therefore, has a train of pulses generated upon every outward crossing of the beam spot 30 with respect to the target track 16 (see FIG. 3) on the optical disk 12. The AND gate 154 calculates a logical product of the signals Sm2 and Sck' to produce an output signal Sa2. The output signal Sa2, therefore, has a train of pulses generated upon every inward crossing of the beam spot 30 with respect to the target track 16 on the optical disk 12.

The microprocessor 170 generates a moving direction designation signal Sc1 for designating a direction in which the beam spot 30 is to be moved upon track access. The AND gate 156 calculates a logical product of the signals Sc1 and Sa1 to generate an output signal Sa3. The AND gate 162 calculates a logical product of the signals Sc1 and Sa2 to generate an output signal Sa4. The AND gate 158 calculates a logical product of a signal Sc1' obtained by inverting the signal Sc1 and the signal Sa1 to generate an output signal Sa5. The AND gate 160 calculates a logical product of the signal Sc1' obtained by inverting the signal Sc1 and the signal Sa2 to generate an output signal Sa6. The OR gate 164 calculates a logical sum of the signals Sa3 and Sa6 to produce an output signal So1, whereas the OR gate 166 calculates a logical sum of the signals Sa4 and Sa5 to generate an output signal So2. Therefore, the signal So1 has a train of "pulses in the same direction" which consists of only pulse components extracted from the above-mentioned pulse trains Sa1 and Sa2, and having the same direction as the direction in which the beam spot 30 is to be moved. On the other hand, the signal So2 has a train of "pulses in the opposite direction" which consists of only pulse components extracted from the above-mentioned pulse trains Sa1 and Sa2, and having a direction opposite to a direction in which the beam spot 30 is to be moved. These signals So1 and So2 are supplied to count-down and count-up inputs D and U of the counter 172, respectively.

The microprocessor 170 also generates a moving amount designation signal Sc2 for designating the number of tracks through which the beam spot 30 is to be moved during track access. The moving amount designation signal Sc2 is supplied to the counter 17 to set the number of tracks as an initial value. The counter 172 counts up or down the initial set value in the following manner. The counter 172 counts up the internally held count value upon each input of the pulse (pulse in the opposite direction) of the signal So2, and counts down the internally held count value upon each input of the pulse (pulse in the same direction) of the signal So1. The counter 172 outputs a count result signal Scnt. An output signal from the counter 172 is reset to be "0" after the beam spot 30 moves on the optical disk 12 along the direction designated by the moving amount designation signal Sc2 from the microprocessor 170 to cross the tracks having the number designated by the moving direction designation signal Sc1, in practice. The counter signal Scnt is always supplied to the comparator 174. When the fact that the signal Scnt is reset to be "0" is detected by the comparator 174, a comparison result signal is generated as a track access end designation signal Sout.

Figure 7:
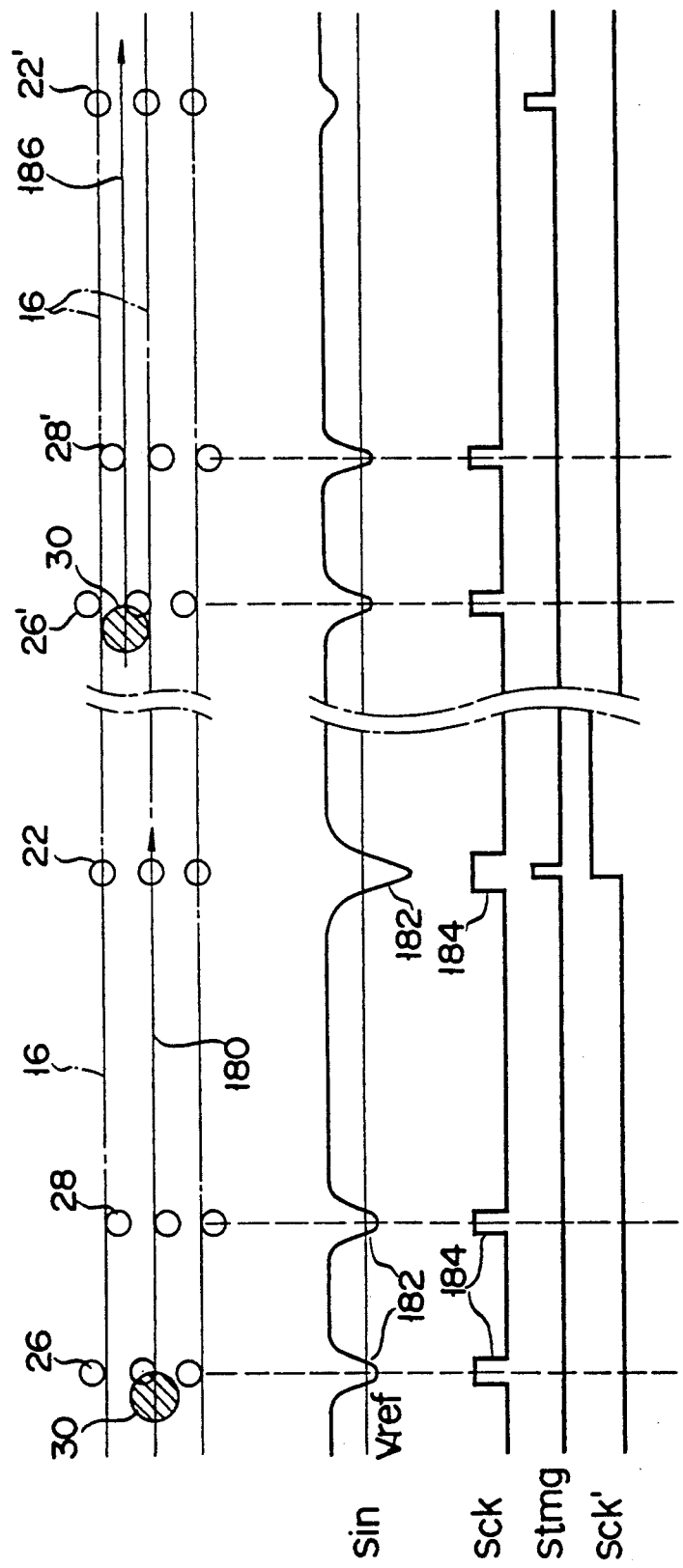
FIGS. 7 and 8 are diagrams showing waveforms of main signals generated in main parts of a tracking-servo control section shown in FIG. 6 in the same time scale.

An operation of the above embodiment will be described below in detail with reference to FIGS. 7 and 8. When the beam spot 30 is tracing the track 16 along an arrow 188, the level of the reflected light detection signal 50 (Sin) supplied from the photodetector 48 (see FIG. 1) largely changes in correspondence with the positions of the first and second wobbled pits 26 and 28 and the clock pit 22, as shown in FIG. 7. The signal Sin is compared with a reference signal Vref by the level comparator 142 to detect waveform components 182 having a level lower than the reference level Vref of the peak waveforms of the signal Sin. The clock pit detection signal Sck has pulse components 184 which are generated in correspondence with these waveform components 182. The binary clock pit detection signal Sck' obtained by edge detection by the flip-flop 144 using the timing signal Stmg changes from "L" level to "H" level in synchronism with a leading edge of a pulse of the timing signal Stmg because the clock pit detection signal Sck goes to "H" level at a leading edge of the timing signal Stmg.

As shown in the left half of FIG. 7, when the beam spot 30 traces the center of the track 16, and accurately traces the clock pit 22, the binary clock pit detection signal Sck' has a high level. In contrast to this, as shown in the right half of FIG. 7, when the beam spot 30 traces between the two adjacent tracks along an arrow 186, and does not trace the clock pit 22 at all, the binary clock pit detection signal Sck' goes to a low level. Therefore, when a signal level of the clock pit detection signal Sck' is monitored, a trace state of the beam spot 30 with respect to the clock pits 22 can be detected.

Figure 8:
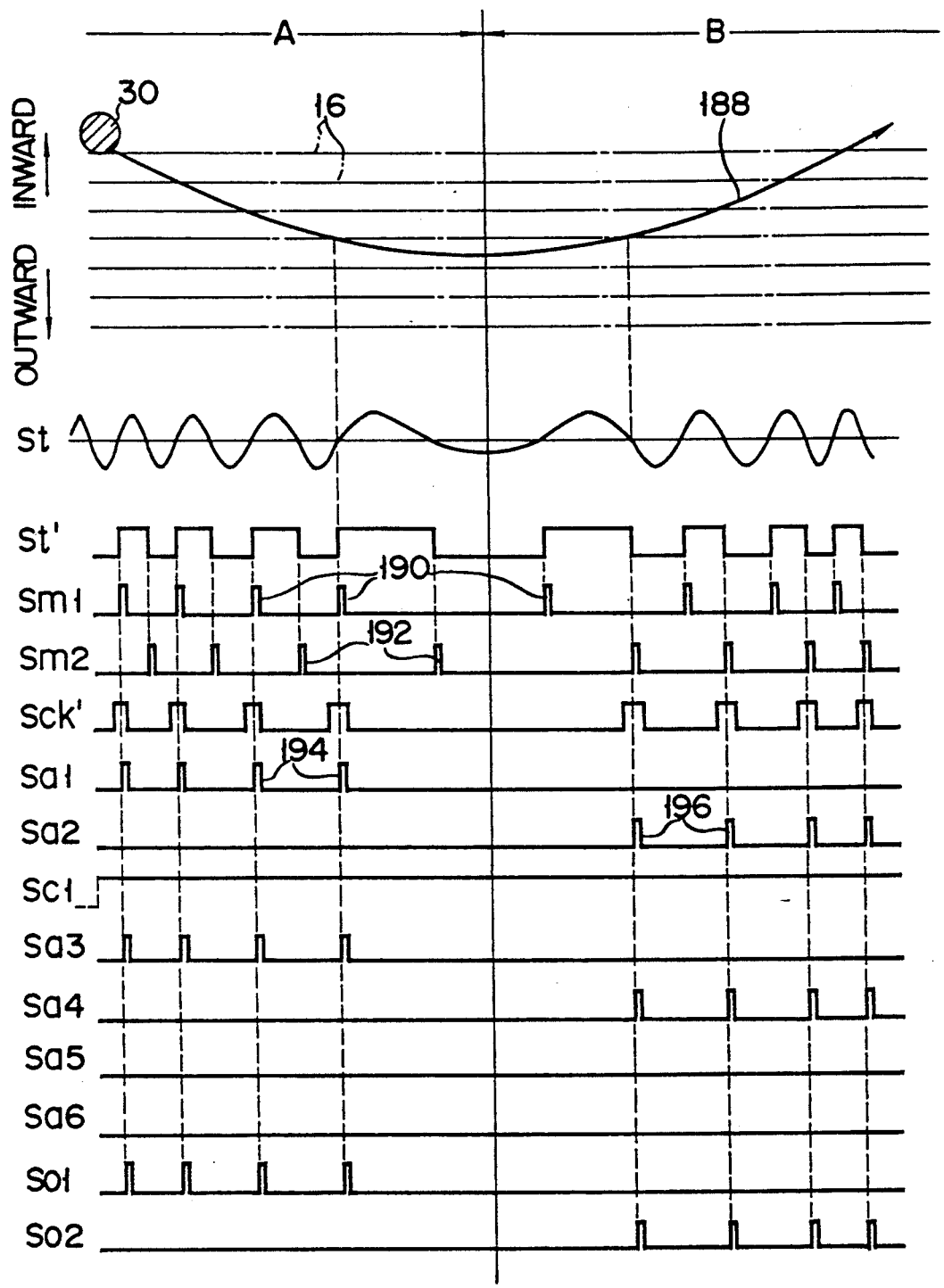

When the beam spot 30 moves on the disk surface to cross some tracks 16 due to the eccentricity of the optical disk 12, as indicated by the arrow 188 in FIG. 8, the signals St, St', Sm, Sck', Sa, and So change, as shown in the remaining area of FIG. 8. The leading edge detection pulse signal Sm1 and the trailing edge detection pulse signal Sm2 respectively obtained by detecting the leading and trailing edges of the tracking error signal St' by the first and second monostable multivibrators 146 and 148 are as follows: the signal Sm1 has pulse components 190 with small widths generated in synchronism with the leading edges of the pulses of the binary tracking error signal St', whereas the signal Sm2 has pulse components 192 with small widths generated in synchronism with the trailing edges of the pulses of the binary tracking error signal St'.

The output signal Sa1 from the AND gate 152 has pulse components representing a logical product of the signals Sm1 and Sck'. The output signal Sa2 from the AND gate 154 has pulse components representing a logical product of the signals Sm2 and Sck'. During a period A in which the beam spot 30 outwardly crosses a certain track 16, the signal Sa1 has pulse components 194. At this time, the signal Sa2 has no pulse component at all, but holds a constant signal level. On the other hand, during a period B in which the beam spot 30 inwardly crosses a certain track 16, the signal Sa2 has pulse components 196. At this time, the signal Sa1 has no pulse component at all. Therefore, when the output pulse signals Sa1 and Sa2 from the AND gates 152 and 154 are monitored, the track-crossing direction and the position of the beam spot 30 can be accurately discriminated.

In order for the beam spot 30 to accurately capture the target track during the period A, the beam spot 30 must be moved by a track shift detection amount along a direction opposite to the detected track-crossing direction under the control of the microprocessor 170. An operation in this case is as follows.

In this embodiment, in order to move the beam spot 30 from the outer periphery to the inner periphery of the optical disk 12, the microprocessor 170 is producing the moving direction designation signal Sc1 constantly having "H" level. In this state, the pulse train 194 of the signal Sa1 is supplied to the counter 172 as the pulse train in the same direction which coincides with a direction in which the beam spot 30 is to be moved. At the same time, the pulse train 196 of the signal Sa2 is supplied to the counter 172 as a pulse train in a direction opposite to the direction in which the beam spot 30 is to be moved. As described above, the counter 172 counts down to update the present count value thereof in response to the pulse train in the same direction, and counts up to update the present count value thereof in response to the pulse train in the opposite direction. Therefore, the value held by the counter 172 is set to be "0" after the beam spot 3 which is access-moved on the optical disk 12 along the direction designated by the moving direction designation signal Sc1 from the microprocessor 170 moves by a distance corresponding to the number of tracks designated by the moving amount designation signal Sc2 from the microprocessor 170. A "0" reset operation of the count value is detected by the comparator 174. Therefore, the track access end signal Sout can be obtained on the basis of an output signal from the comparator 174. When tracking-servo control is performed using this signal, the precision of the track-accessing control can be further improved.

Figure 9:
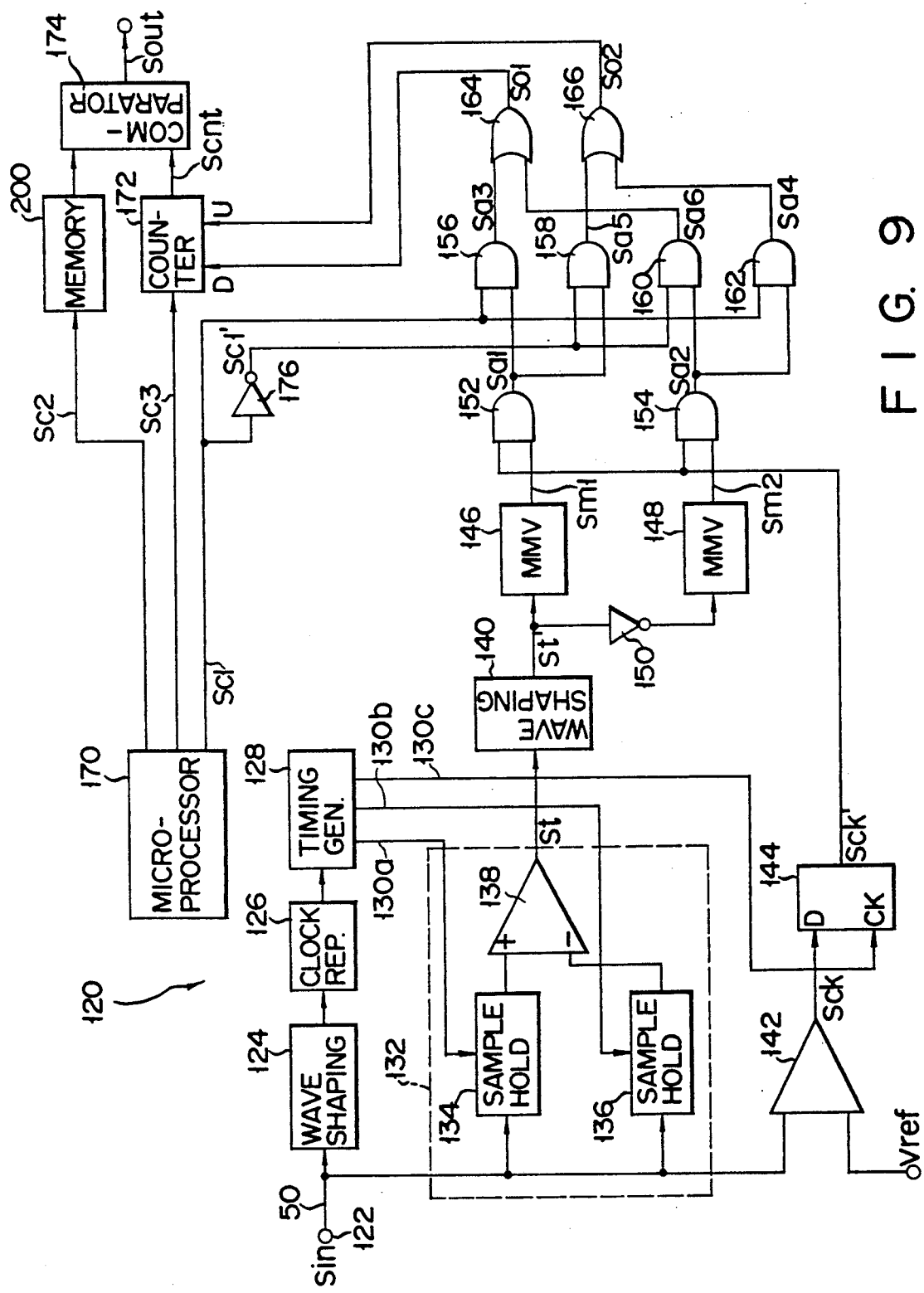
FIG. 9 is a block diagram showing a modification of the circuit arrangement shown in FIG. 6.

The track access control section 120 shown in FIG. 6 can be modified, as shown in FIG. 9, wherein the same parts as in the circuit arrangement shown in FIG. 6 are denoted by the same reference numerals, and a detailed description thereof will be omitted.

A circuit arrangement shown in FIG. 9 is different from that of the embodiment shown in FIG. 6 only in that a memory 200 is additionally arranged. More specifically, data of the number of tracks through which the beam spot 30 must cross which is designated by the moving amount designation signal Sc2 from the microprocessor 170 is stored in the memory 00. The microprocessor 170 produces the signal Sc3 representing an initial value, i.e., "0", which is supplied to and set in the counter 172. The counter 172 counts up to update the present count value thereof in response to the pulse train in the same direction, and counts down to update the present count value thereof in response to the pulse train in the opposite direction. A comparator 202 is connected to the counter 172 and the memory 200, and is always comparing the actual count result of the counter 172 with the initial value of the memory. When these values become equal to each other, the comparator 202 produces the track access end signal Sout.

Figure 10:
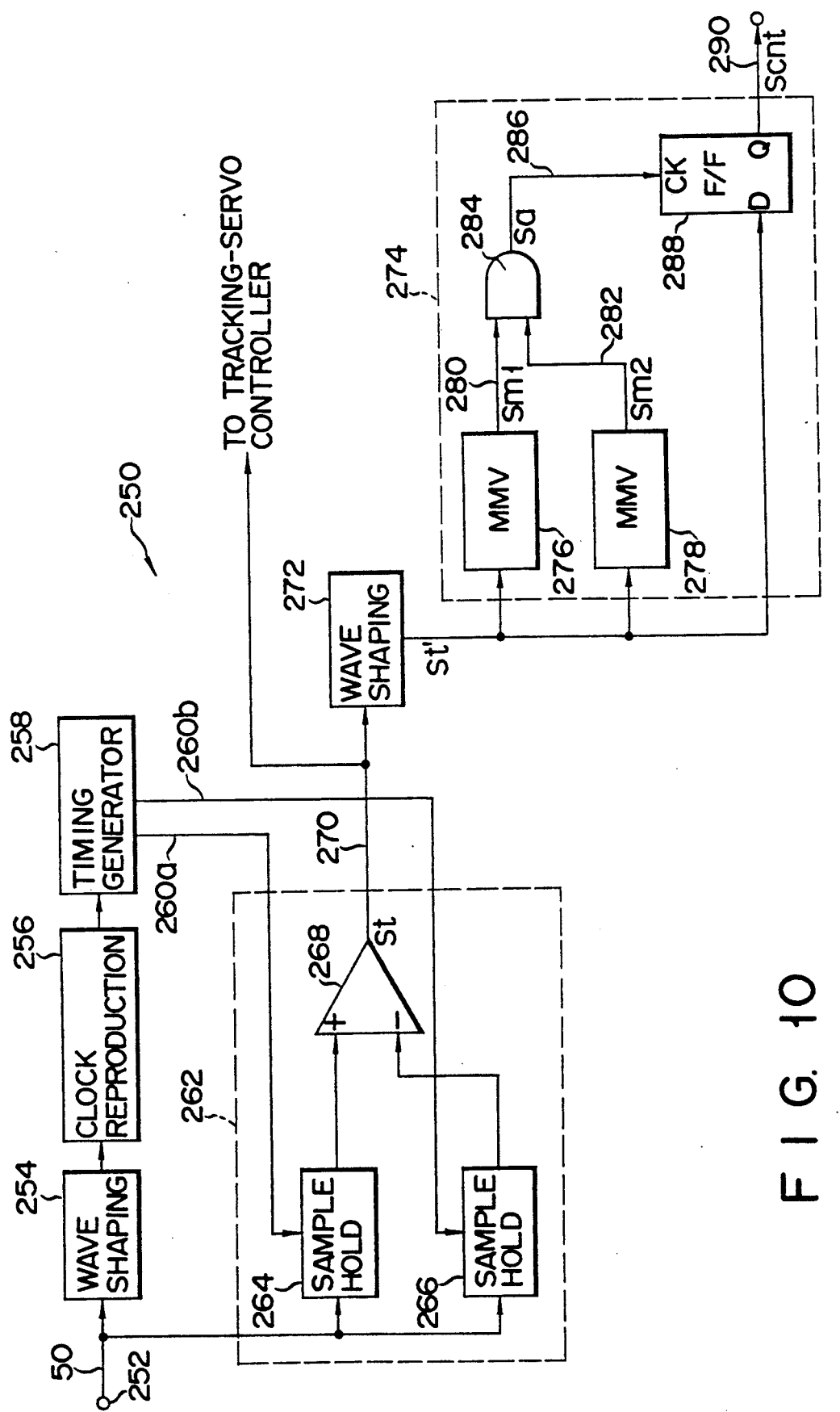
FIG. 10 is a schematic diagram showing a circuit arrangement of a main part of an optical disk apparatus according to the third embodiment of the present invention.

Turning now to FIG. 10, a track access control section of an optical disk apparatus according to the third embodiment of the present invention is generally designated by reference numeral "250". The track access control section 250 has an input 252 to which a reflected light signal 50 is externally supplied. The signal 50 (to be often referred to as an input signal Sin hereinafter) is supplied through a wave shaping circuit 254 and a clock reproduction circuit 256 to a timing generation circuit 258, which generates timing signals 260a and 260b. These timing signals will be often referred to as "Stmg" in the following description.

A servo error detection circuit 262 includes sample hold circuits 264 and 266. These sample hold circuits receive the timing signals 260a and 260b, respectively. Output signals from the sample hold circuits 264 and 26 are supplied to a differential amplifier 268. An output signal 270 of the differential amplifier 268 is supplied to a wave shaping circuit 272 as a tracking error signal St. The wave shaping circuit 272 generates a binary tracking error signal St'. An arrangement required to generate such a tracking error signal is basically the same as those in the above embodiments. The tracking error signal St' is supplied to a track-cross signal generation circuit 274.

The track-cross signal generator 274 includes two monostable multivibrators 276 and 278. The monostable multivibrator 276 operates upon every leading edges of pulses of the tracking error signal St'; and the monostable multivibrator 278 operates upon every trailing edges of the pulses of the tracking error signal St'. Output signals 280 and 282 (to be respectively referred to as "Sm1" and "Sm2" hereinafter) from the monostable multivibrators 276 and 278 are supplied to inputs of an AND gate 284, respectively. An output signal 286 (to be often referred to as "Sa" hereinafter) from the AND gate 284 is supplied to a clock input of a flip-flop circuit 288. The flip-flop 288 includes a D input, to which the tracking error signal St' is supplied. An output signal 290 from the flip-flop 288 acts as a track-cross count result signal Scnt.

An operation of the track-cross signal generator 274 will be described below in detail with reference to FIG. 11. A state wherein a beam spot 30 traces and crosses adjacent tracks on an optical disk 12 along an oblique arrow 292 is exemplified in the uppermost area of FIG. 11. The lower track includes a defective pit 294. At this time, the signal level of the tracking error signal St is largely decreased due to a decrease in amount of reflected laser beam at the position of the defective pit 294, as designated by reference numeral "296". Therefore, the binary tracking error signal St' is erroneously level-inverted, as designated by reference numeral "298". The tracking error signal St returns to the correct signal level in the next correct pit after the defective pit 294 is traced. As a result, the tracking error signal St' has an erroneous pulse 300. Such a tracing state of the beam spot 30 typically tends to occur when the optical disk 12 is eccentric. Even if such a case is present, the track-cross signal generator 274 can eliminate an adverse effect due to the defective pit 294 to count a correct number of track crosses. This will be described hereinafter.

Figure 11:
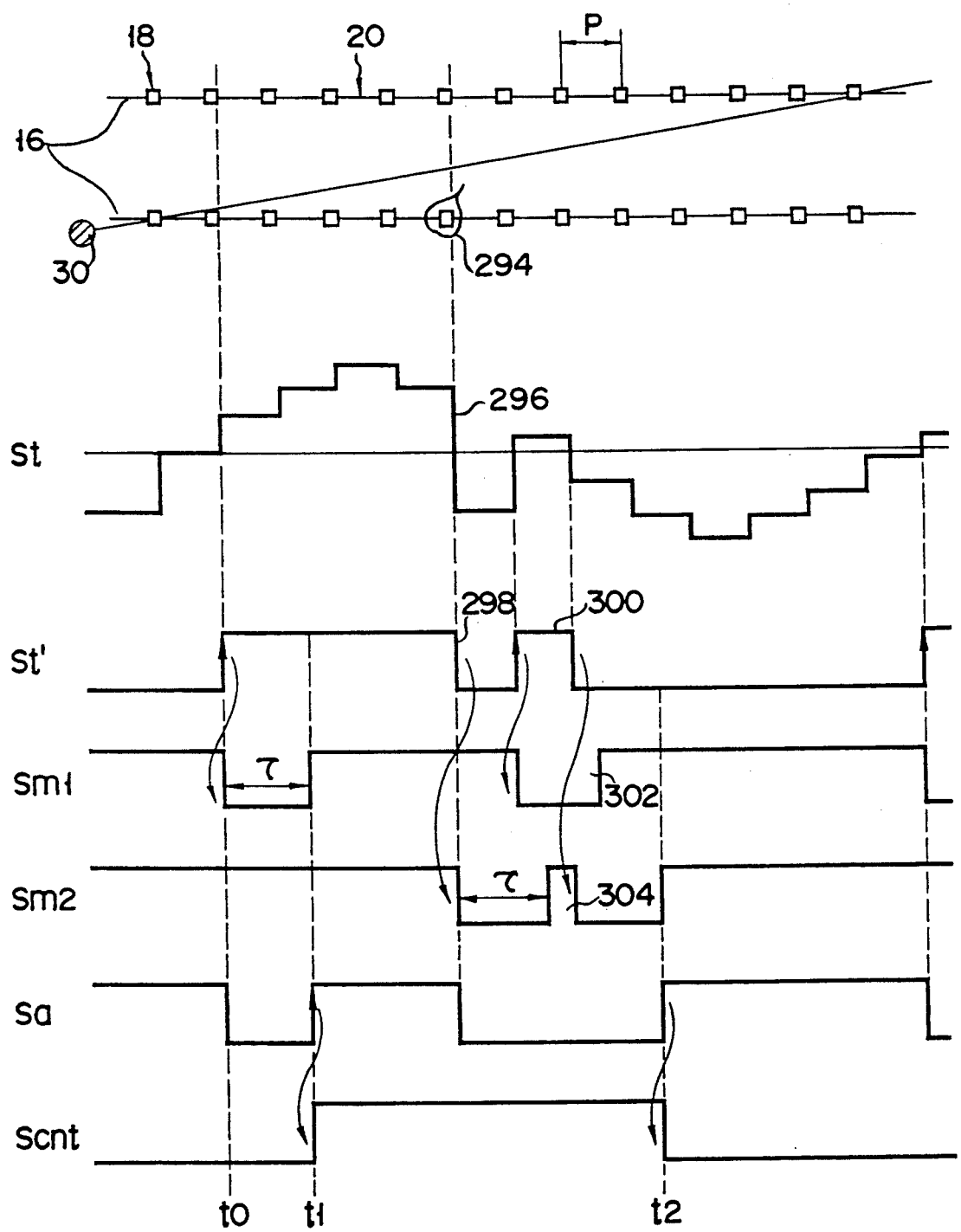
FIG. 11 is a diagram showing waveforms of main signals generated in main parts of a tracking-servo control section shown in FIG. 10 in the same time scale.

As shown in FIG. 11, the output signal Sm1 from the monostable multivibrator 276 which is sensitive to the leading edges of the pulses of the binary tracking error signal St' is inverted in response to the leading edge of the erroneous pulse 300 of the binary tracking error signal St', and returns to the original logic level when the next correct pit is traced. As a result, the signal Sm1 has a pulse 302. Reference symbol "$\tau$" denotes a time constant of the monostable multivibrator 276. On the other hand, the output signal Sm2 from the monostable multivibrator 278 which is sensitive to the trailing edges of the pulses of the binary tracking error signal St' is inverted in response to the trailing edge of the erroneous pulse 300 of the binary tracking error signal St', and returns to the original logic level when the next correct pit is traced. As a result, the signal Sm1 has a pulse 304.

An adverse effect on a track-cross counting operation due to such erroneous pulse components can be effectively eliminated by performing logical product processing (AND processing) of the signals Sm1 and Sm2 by the AND gate 284. As shown in FIG. 11, the output signal Sa from the AND gate 284 is insensitive to a level change of the pulse 302 or 304. Therefore, the logic level of the binary tracking error signal St' is determined in synchronism with generation of the pulse leading edges of the signal Sa (e.g., at time t1), and the determination result is held by the monostable multivibrator 288 till the next determination time (t2). It is important that the determination time t1 is delayed from a leading edge t0 of the binary tracking error signal St' by the time constant r. As a result, the output signal 290, i.e., the track-cross count signal Scnt, from the monostable multivibrator 288 can be obtained. The track-cross count signal Scnt is level-inverted since the binary tracking error signal St' is set at "H" level at the delayed determination time t1; and is level-inverted again since the binary tracking error signal St' is set at "L" level at the succeeding determination time t2. More specifically, the track-cross count value is counted up by "1" upon every crossing of the beam spot 30 with respect to the tracks. As is illustrated in FIG. 11, it is apparent that the track-cross count signal Scnt holds a constant logic level regardless of generation of the erroneous pulses 302 and 304. This substantially means that the erroneous pulse 300 of the binary tracking error signal St' can be eliminated to perform accurate track-cross counting. The accuracy of track-cross counting will greatly contribute to an improvement of track-accessing control of the optical disk 12

Statistically, according to the optical disk of this type, the size (the length in a track extending direction) of a defective pit which is present on a certain track is substantially the same as those of the correct pits recorded on the optical disk in advance, as shown in FIG. 12. In practice, it is considered that the size of the defective pit is the same as or smaller than an arrangement interval (to be also referred to as an "alignment pitch") P (see FIG. 11) of the servo regions 18 of the optical disk 12. When the arrangement interval P of the servo patterns is converted into a period of time T required to relatively move the beam spot 30 on the optical disk 12 by the distance P, the width of the erroneous pulse 300 is normally smaller than the period of time T. Therefore, when the time constant $\tau$ of the monostable multivibrators 276 and 278 is set to be equal to or larger than the time period T, an adverse effect of generation of the erroneous pulse 300 on the track-cross counting can be perfectly eliminated.

In addition, an upper limit of the time constant $\tau$ is preferably 2T for the following reason. Even if the time constant $\tau$ is set to be larger than 2T, the elimination performance of the adverse effect of the erroneous pulse is not substantially improved, but a delay time of the track-cross counting operation with respect to the binary tracking error signal St' is undesirably increased.

It is to be noted that the circuit arrangement of FIG. 10 may be also applied to process the binary clock pit detection signal Sck' that is shown in FIG. 1, 5, 6, or 9.

Turning now to FIG. 13, a direct track access control section of an optical disk apparatus according to the fourth embodiment of the present invention is generally designated by reference numeral "300". In this embodiment, an optical disk 301 is not limited to a sample-servo formatted optical disk. A pre-groove optical disk having track grooves may be employed. Assume that the optical disk 301 is of a pre-groove type in the following description.

Direct track accessing typically consists of operations in a beam moving velocity control mode and a beam position control mode (to be also referred to as a tracking-servo control mode) succeeding the beam moving velocity control mode. In the beam moving velocity control mode, a reference moving velocity of a beam spot is changed in accordance with the number of tracks (the number of residual tracks) through which the beam spot must cross on the optical disk 301 until the spot reaches a target track. The relationship therebetween is set in advance following a conversion table format. A relative velocity detected in practice between the beam spot and the optical disk 301 is always compared with the reference velocity. A linear motor (322 in FIG. 13) for driving an optical head unit is controlled to cause the detected relative velocity to coincide with the reference value at that time. When it is detected that the beam spot reaches the target track, the tracking-servo control mode is set. Thereafter, the position of the optical head unit is controlled so that the beam spot precisely traces on the target track.

As shown in FIG. 13, output signals from two-divided photodetectors 48a and 48b are supplied to a signal difference generator 304 and a signal sum generator 306 through amplifiers 302a and 302b, respectively. A difference signal S- from the signal difference generator 304 is supplied to phase compensators 308 and 310 as a tracking error signal of a beam spot (30). The phase compensator 308 is connected through a switching circuit 312 and a drive amplifier 314 to a lens actuator 316, which drives a lens system of an optical head unit 38. The phase compensator 310 is connected through a switching circuit 318 and a drive amplifier 320 to a linear motor 322, which mechanically drives the optical head unit 38 to radially move the beam spot 30 on the optical disk 301.

A track accessing velocity control circuit 325 performs control so that the beam spot quickly and accurately moves from an arbitrary track to the designated target track on the optical disk 301. The track accessing velocity controller 325 includes track pulse generation circuits 324 and 326. The difference signal S— from the signal difference generator 304 is supplied to the track pulse generator 324; and a sum signal S+ from the signal sum generator 306 is supplied to the track pulse generator 326. The track pulse generator 324 is connected to a phase compensation circuit 330 through a velocity (rate) detection circuit 328. The track pulse generators 324 and 326 are connected to a phase comparator 332. An output of the phase comparator 332 is connected to the rate detector 328 and a track counting circuit 334. The counter 334 is connected to a reference velocity (rate) generation circuit 336 and a distance detection circuit 338, as shown in FIG. 13. An output signal from the track pulse generator 324 is also supplied to the counter 334 and the distance detector 338.

The distance detector 338 receives output signals from the two track pulse generators 324 and 326. The distance detector 338 is connected to a controller circuit 340. The controller 340 mutually communicates the count data with the counter 334. The output of the controller 340 is connected to the switching circuits 312 and 318.

When track-accessing control is started, the number of tracks (the number of moving tracks) required to move the beam spot on the optical disk 301 from the track which is presently being traced to a desired track is set on the track counter 334 by the controller 340. The controller 340 turns off the switch 312 to switch the switch 318, as shown in FIG. 13, thus changing from a track trace control mode to a velocity control mode. The counter 334 subtracts the number of input moving tracks which is input from the present track count to output the difference as "the number of residual tracks". The reference velocity generator 336 outputs a reference velocity signal Sv0 representing a variable beam moving velocity. The reference velocity signal Sv0 is changed to be gradually decreased after the beam spot 30 reaches a predetermined short distance, and to be set at "0" at the moment when the beam spot 30 is located immediately on a target track N (this means stop of the beam spot). Since the counter 334 continuously counts the current number of tracks, the value of the residual track signal is decreased as the beam spot approaches the target track.

The phase comparator 332 detects a relative moving direction of the beam spot on the optical disk 301 in response to the difference signal S— (tracking error signal) an the sum signal S+ (total reflected light amount signal). An output signal from the comparator 332 is input to the velocity detector 328 and the counter 334 as the beam spot moving direction signal Smd. The velocity detector 328 counts a pulse cycle of a track pulse signal Stp1 generated from the track pulse generator 324 to obtain a value in proportion to a reciprocal of the counted pulse cycle as a "magnitude of rate". When the positive or negative sign is specified in response to a moving direction signal Smd, the detection velocity signal Sv is generated. A difference between the reference velocity signal Sv0 and a detection velocity signal Sv is supplied to the phase compensator 330 as a velocity error signal Sve. The phase compensator 330 performs velocity control phase compensation in response to the velocity error signal Sve, thereby driving the linear motor 322.

During velocity control, the first track pulse signal Stp1 acts as a count-down pulse signal when the moving direction of the beam spot coincides with a direction represented by the moving direction signal Smd; and the track pulse signal Stp1 acts as a count-up pulse signal when the moving direction of the beam spot is opposite to the direction represented by the moving direction signal Smd. Therefore, the number of residual tracks on the counter 334 is decreased as the beam spot approaches the target track. When the number of residual tracks is decreased to be "0", the controller 340 generates an operation mode switching signal Sch. In response to the signal Sch, the switch 312 is turned on, and the switch 318 is switched to a position opposite to the position shown in FIG. 13. As a result, an operation mode of the track access control section is switched from the velocity control mode to the track tracing control mode. At this time, normal track capture is performed, and the beam spot is set on the target track, thereby performing direct access. A further detailed description of such a direct accessing control operation is disclosed in, e.g., Japanese Patent KOKAI (disclosure) Nos. 57-55542 and 57-176568.

Figure 14:
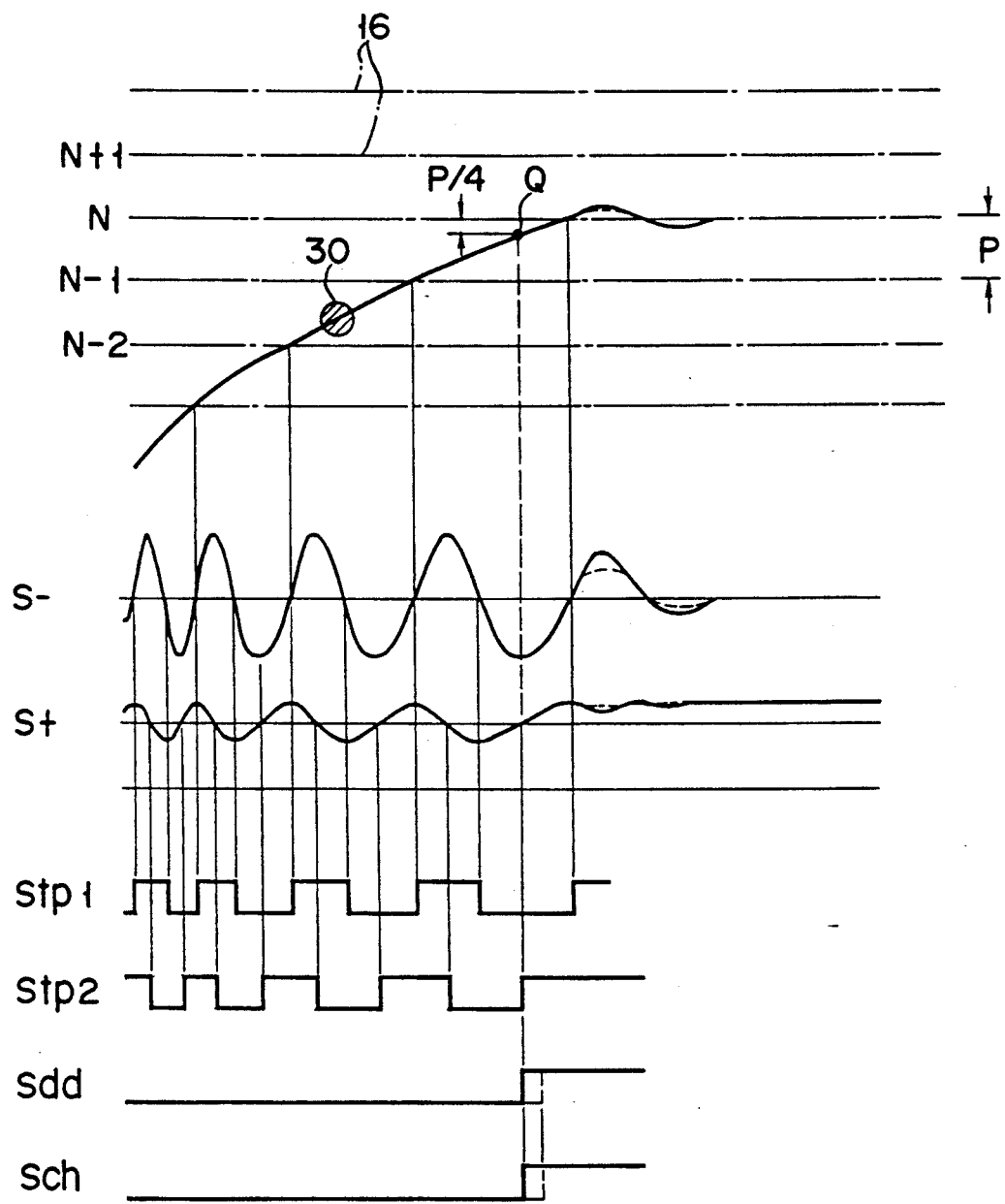
FIG. 14 is a diagram showing waveforms of main signals generated in main parts of a track access control section shown in FIG. 13 in direct track accessing in the same time scale.

As shown in FIG. 13, according to this embodiment, the first and second track pulse signals Stp1 and Stp2 and the count signal from the counter 334 are supplied to the distance detector 338. When the approaching beam spot approaches the target track by a preselected distance, the detector 338 detects this fact to output a detection signal Sdd. The distance detector 338 is preferably set to be smaller than a quarter of the alignment interval (pitch) P between the neighboring tracks. For example, the distance detector 338 is arranged to watch whether the distance between the moving spot and the target track is P/4 or less. When it is detected that the approaching beam spot enters this specific distance rang, the controller 340 supplies the above-mentioned operation mode switching signal to the switches 312 and 318 in response to the detection signal Sdd. As shown in FIG. 14, therefore, when the beam spot 30 which is approaching the target track reaches a specific point Q (see FIG. 14) before the target track N by P/4, the velocity control mode is stopped, and the normal tracking-servo (track-tracing) control mode is immediately set. With such an arrangement, a failure of direct access can be reliably prevented. For example, it is prevented that the beam spot which is moving at high speed is not captured by the target track but passes through the target track ("overshoot") although the reference velocity signal Sv0 from the reference velocity generator 336 is set at "0" (this means that the beam spot 30 stops) when the beam spot 30 reaches the target track N. Therefore, the precision and stability of track capture in direct track accessing can be improved.

Figure 16:
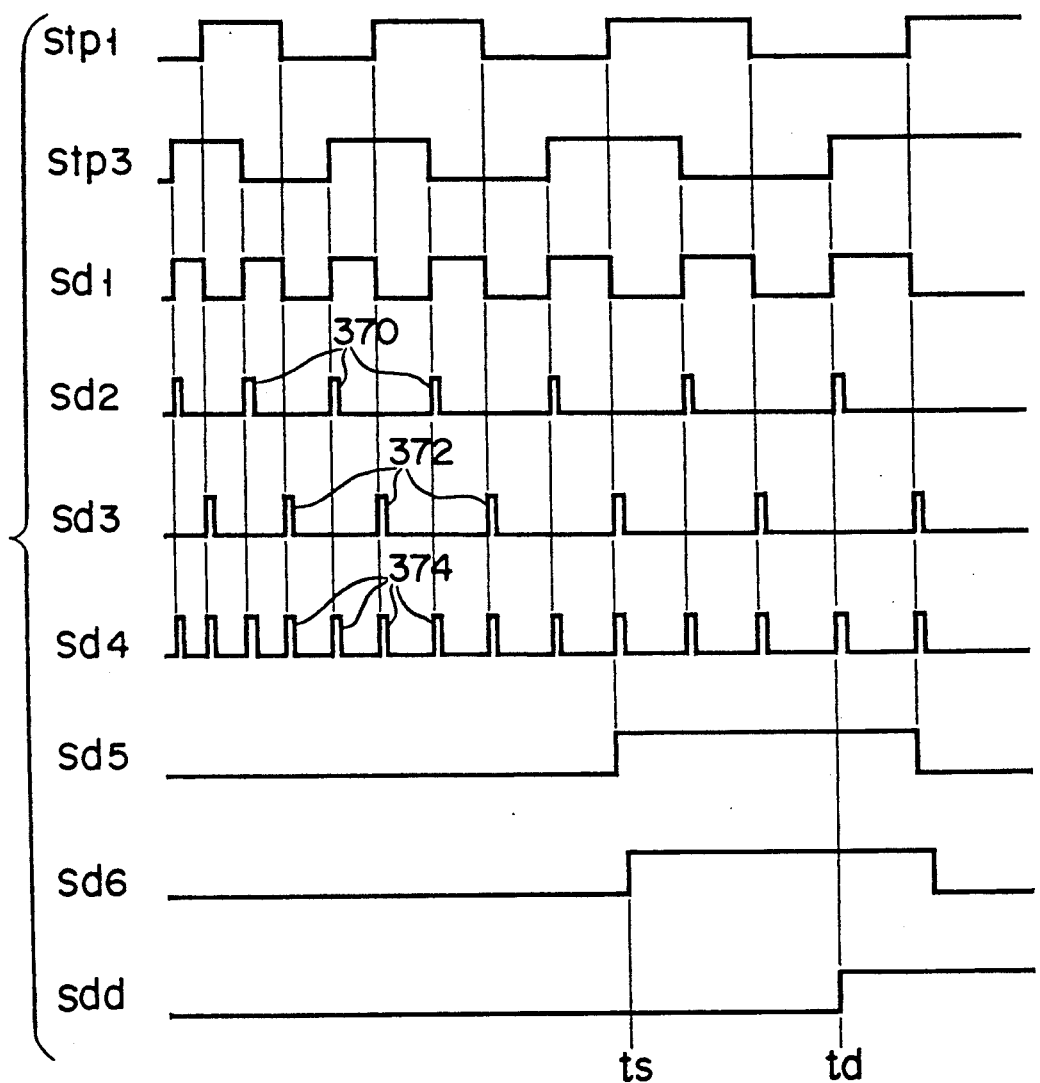
FIG. 16 is a diagram showing waveforms of main signals generated in main parts of the distance detection circuit shown in FIG. 15 in the same time scale.

As shown in FIG. 15, the distance detector 338 includes an exclusive OR gate 350, first and second monostable multivibrators 352 and 354, an OR gate 356, a one-track detection circuit 358, a delay circuit 360, and a ¼ track pulse counter circuit 362. In FIG. 16, waveforms of main signals generated in main sections in the above circuits are shown in the same time scale.

A pulse signal Sd1 representing the above-mentioned specific approaching distance P/4 can be obtained by inputting the first and second track pulse signals Stp1 and Stp2 (their phases are shifted by 90°) to the exclusive OR gate 350. The first monostable multivibrator 352 generates a signal Sd2 having pulses 370 with small widths generated in response to leading edges of pulses of the signal Sd1. The second monostable multivibrator 354 generates a signal Sd3 having pulses 372 with small widths generated in response to trailing edges of the pulses of the signal Sd1. These signals Sd2 and Sd3 are supplied to the OR gate 356. An output signal from the OR gate 356, therefore, serves as a ¼ track pulse signal Sd4. The ¼ track pulse signal Sd4 is supplied to the ¼ track pulse counter 362.

On the other hand, the residual track count signal output from the track counter 334 is supplied to the one-track detector 358. The detector 358 generates a residual track count detection signal Sd5 representing the number of remaining tracks through which the moving beam spot 30 must cross until it reaches the target track N. The signal Sd5 is delayed by the delay circuit 60. The delay time is longer than the pulse width of the ¼ track pulse signal Sd4. An output signal Sd6 from the delay circuit 360 is supplied to the ¼ track pulse counter 362 as a ¼ track count enable signal.

Therefore, when the counter 362 detects three ¼ track pulses 374 (at time td) after time ts (i.e., time when the number of residual tracks is set to be "1") of a level change in signal Sd6, the detection signal Sdd is output. With such an arrangement, it is detected with high reliability that the approaching beam spot 30 reaches the point Q (see FIG. 14) before the target track N by P/4.

Figure 17:
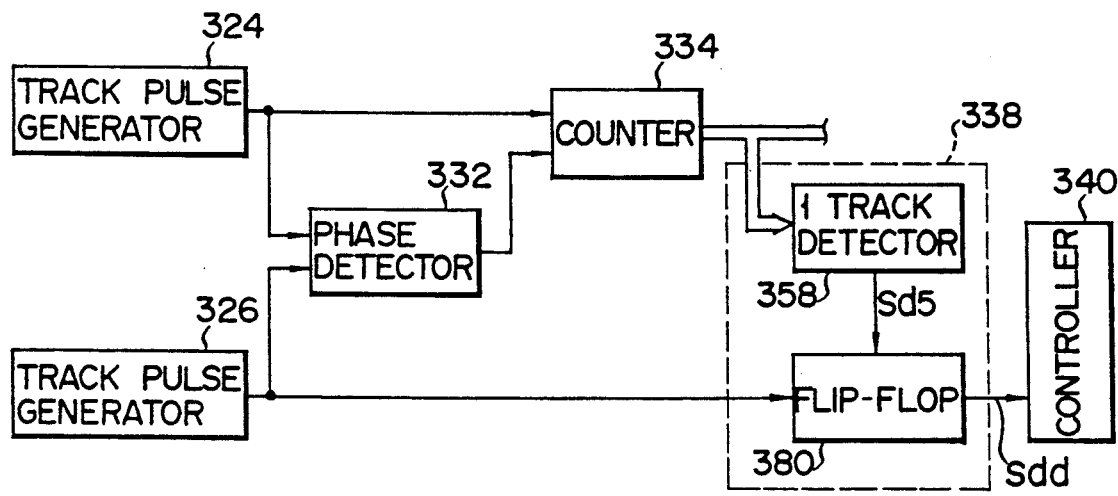
FIG. 17 is a block diagram showing a modification of the distance detection circuit shown in FIG. 15.
Figure 18:
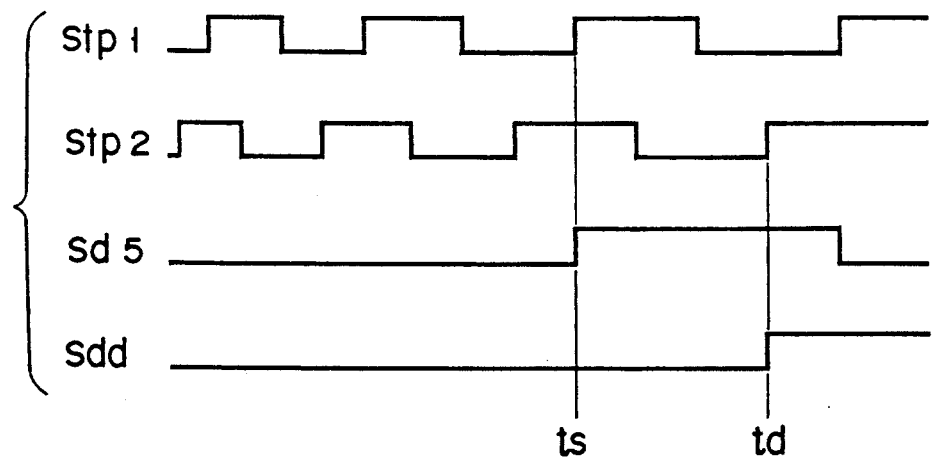
FIG. 18 is a diagram showing waveforms of main signals generated in main parts of the distance detection circuit shown in FIG. 17 in the same time scale.

As shown in FIG. 17, the distance detector 338 may be modified, wherein a flip-flop circuit 380 for receiving output signals from the track pulse generator 326 and the one-track detector 358 is arranged. The one-track detector 358 detects that the number of tracks, (the number of residual tracks) through which the beam spot 30 which is approaching the target track N while crossing some tracks must cross to reach the target track, is set to be "1", as in the embodiment shown in FIG. 15. As shown in FIG. 18, the flip-flop 380 detects the ¼ track approaching point td by inputting the second track pulse signal Stp2 immediately after the time ts at which the residual track detection signal Sd5 is set at "H" level.

FIG. 19 is a Bode diagram of a tracking-servo control system having open-loop characteristics in the embodiment shown in FIG. 13. FIG. 20 shows a simulation result of the track capture stability of the beam spot 30 obtained by using the Bode diagram and using a capture timing and an entry velocity to the target track N of the beam spot 30 as parameters. On the axis of abscissa of this graph, the position of the target track is designated by "N". "−P/2" represents an upstream position of the target track position (N) by P/2; "−P/4" represents an upstream position of the target track position N by P/4; and "−P/8" represents an upstream position of the target track position N by P/8. "+P/4" represents a downstream position of the target track position N by P/4.

As is apparent from this graph, in direct track accessing mode, if an entry velocity of the beam spot 30 is 8 mm/sec or less, track capture is most stable if the beam spot 30 is captured in the target track N when the spot is positioned immediately thereon; and, in contrast to this, if the beam spot 30 passes through the target track N by only a short distance, the stability of track capture is rapidly degraded. Therefore, it is very risky to execute track capture when the beam spot 30 reaches a position immediately on the target track N. The beam can be captured most stably at this time. However, if a time is slightly shifted, the worst track capture may be executed, thus failing direct access. As described above, even when the beam spot 30 reaches a position on the target track N in practice, and the reference velocity signal Sv0 is set at "0", the fact that the actual moving velocity of the beam spot 30 is not always set at "0" instantaneously (does not always stop) further deteriorates the above problem.

In the above embodiment, however, when a "predetermined track distance upstream capture" technique is employed, a failure of direct track access can be completely prevented, and the track capture stability at that time is relatively good. In the above embodiment, a "predetermined track distance" is selected to be P/4 for the above reason. Obviously, the capture start beam position Q in FIG. 14 is not limited to P/4; e.g., the position Q may be set at a position represented by "−P/8" (or smaller). Various experimental results obtained by the present inventors recommended selection of the position Q to fall within the range of −P/4 or less.

Figure 21:
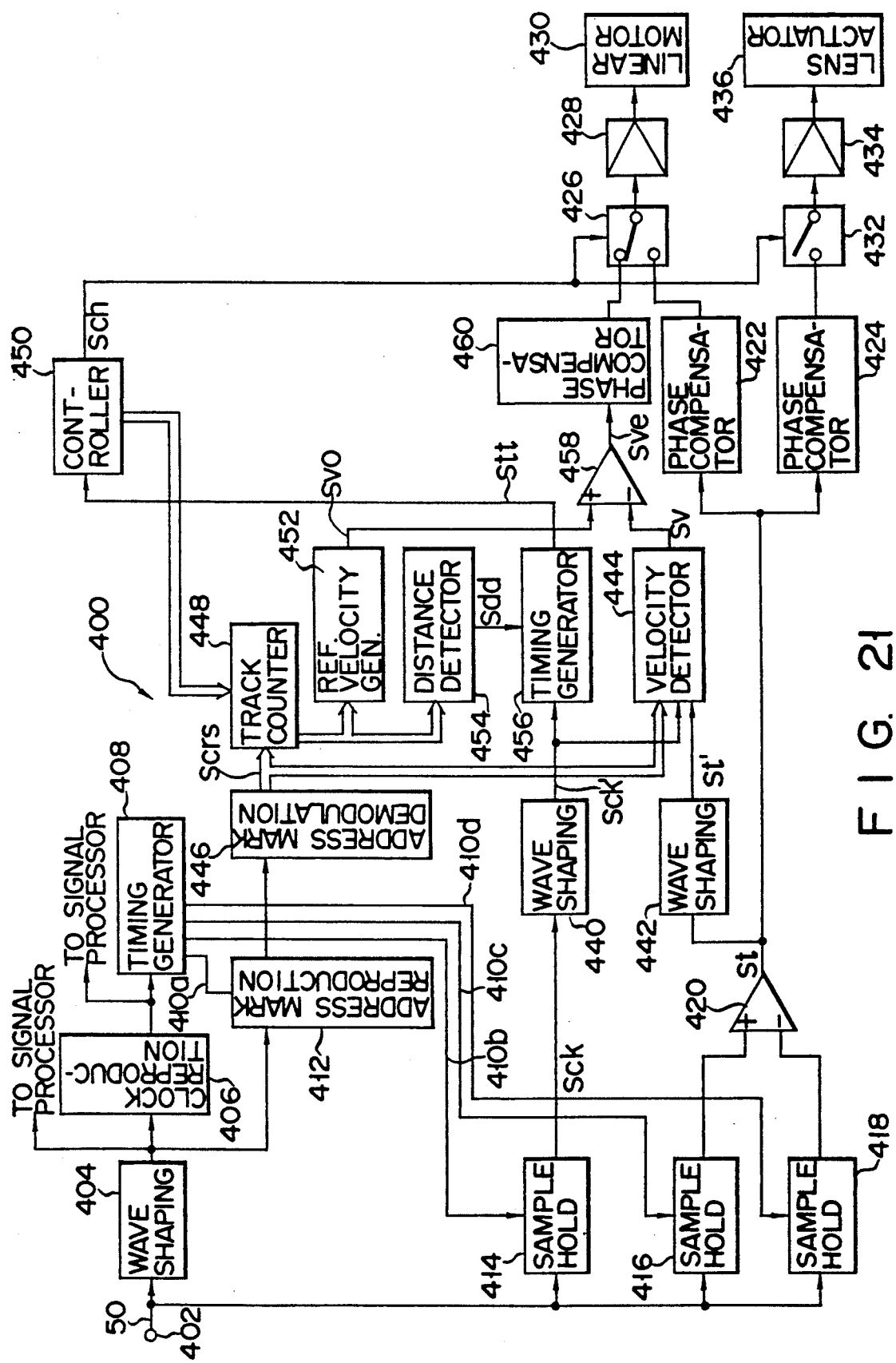
FIG. 21 is a schematic diagram showing a circuit arrangement of a main part of an optical disk apparatus according to the fifth embodiment of the present invention.

FIG. 21, a track access control section of an optical disk apparatus according to the fifth embodiment of the present invention for performing direct track access for a sample-servo formatted optical disk 12 having no track guide groove is generally designated by reference numeral "400". The track access control section 400 includes an input 402 to which a reflection light signal 50 is externally supplied from an optical disk 12'.

A schematic overall shape of the entire optical disk 12' used in this embodiment is the same as in FIG. 2. However, the optical disk 12' is different from an optical disk 12 in FIG. 2 in that each of servo regions 18 has a couple of address mark pits 401 which form an address mark. The address mark pits 401 are formed between a clock pit 22 and wobbled pits 26 and 28 on a central line 24 of the corresponding track. The fifth embodiment provides direct track accessing which is effective for such a sample-servo formatted optical disk 12'.

The reflected light signal 50 (to be often referred to as an input signal Sin hereinafter) is supplied through a wave shaping circuit 404 and a clock reproduction circuit 406 to a timing generation circuit 408, which generates timing signals 410. These timing signals 410 include an address mark detection timing signal 410a, a clock pit detection timing signal 410b, and first and second wobbled pit detection timing signals 410c and 410d. The address mark detection timing signal 410a is supplied to an address mark reproduction circuit. The clock pit detection timing signal 410b is supplied to a sample hold circuit 414. The wobbled pit detection timing signals 410c and 410d are supplied to sample hold circuits 416 and 418, respectively.

Figure 22:
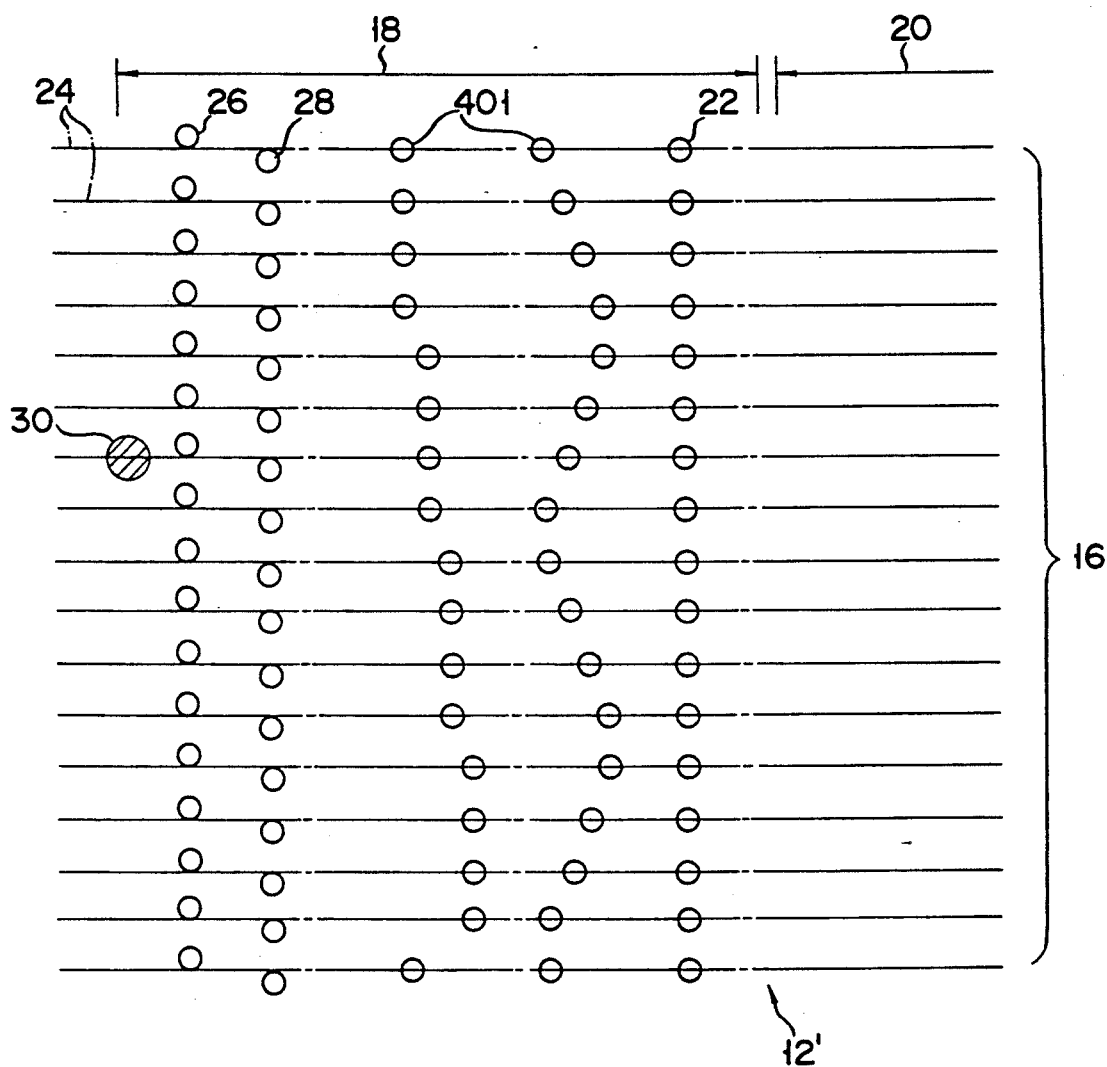
FIG. 22 is a diagram showing an enlarged plan arrangement of a main part of a sample-servo formatted optical disk applied to the embodiment.

Output signals from the sample hold circuits 416 and 418 are supplied to a differential amplifier 420, which produces a tracking error signal St in substantially the same manner as in the above first, second, and third embodiments of the present invention. The tracking error signal St represents a positional error of a radially moving beam spot 30 (see FIG. 22) in a certain track of the optical disk 12'. The tracking error signal St is supplied to gain phase compensation circuits 422 and 424. The gain phase compensator 422 is connected to a linear motor 430 for driving an optical head unit (not shown in FIG. 21: see FIG. 1, for example) through a switching circuit 426 and a drive amplifier circuit 428. The gain phase compensator 424 is connected to a lens actuator 436 for driving a lens system of the optical head unit through a switching circuit 432 and a drive amplifier circuit 434. Such a series circuit connection is the same as that in the above embodiment shown in FIG. 13.

As shown in FIG. 21, wave shaping circuits 440 and 442 are arranged to be connected to the outputs of the sample hold circuit 414 and the differential amplifier 420, respectively. The wave shaping circuit 440 receives a clock pit detection signal Sck produced by the sample hold circuit 414 to output a binary clock pit detection signal Sck'. The wave shaping circuit 442 receives a tracking error signal St to output a tracking error signal St'. These signals Sck' and St' are input to a velocity detection circuit 444. The velocity detector 444 also receives a track-crossing signal Scrs generated by an address mark demodulation (decoding) circuit 446 connected to an address mark reproduction circuit 412. The output signal Scrs from the address mark decoder 446 responsive to an address mark reproduction signal from the circuit 412 has the number of crossing tracks represented by a digital value in accordance with a change in address mark patterns in the servo regions 18 of the optical disk 12'.

The velocity detector 444 counts the number of pulses (cycles) of the binary tracking error signal St' during an initial period of direct track access, and compares the phases of the signals Sck' and St' with each other, thereby detecting the relative moving velocity (direction and magnitude) of the beam spot 30 which is moving at a relatively low speed. The detector 444 detects the relative moving velocity (direction and magnitude) of the beam spot 30 which is moving at a relatively high speed in response to the track-crossing signal Scrs during an intermediate period of direct track access. The detector 444 generates a velocity detection signal Sv representing the detected velocity of the beam spot 30.

The output signal Scrs from the address mark decoder 446 is also supplied to a track counter circuit 448, which is associated with a controller 450, a reference velocity (rate) generation circuit 452, and a distance detection circuit 454 for detecting the residual distance to the target track. The detector 454 is connected to a track capture timing generation circuit 456. The controller 450 is connected to the timing generator 456 and the above-mentioned switches 426 and 432 to control ON/OFF states of the switches 426 and 432 in response to a track capture timing signal Stt. The outputs of the reference velocity (rate) generator 452 and the velocity detector 444 are connected to a differential amplifier 458. The amplifier 458 is connected to a gain phase compensation circuit 460 at the output thereof. The gain phase compensators 422 and 460 are connected to the switch 426; and the switch 426 selectively supplies one of output signals from these circuits 422 and 460 to the drive amplifier 428.

At the beginning of direct track access, the number of tracks through which the beam spot 30 passes until it reaches the target track N is set with the track counter 448 by the controller 450. The counter 448 integrates the number of pulse counts of the track cross signal Scrs therein, and subtracts the integration result (the number of tracks through which the beam spot passes) from an initial value (the number of tracks through which the spot must pass), thus generating a signal representing the subtraction result as the residual track count data signal. This signal is supplied to the circuits 452 and 454. The reference velocity generator 452 produces a reference velocity signal Sv0 representing a reference velocity which varies in accordance with the current number of residual tracks.

Figure 23:
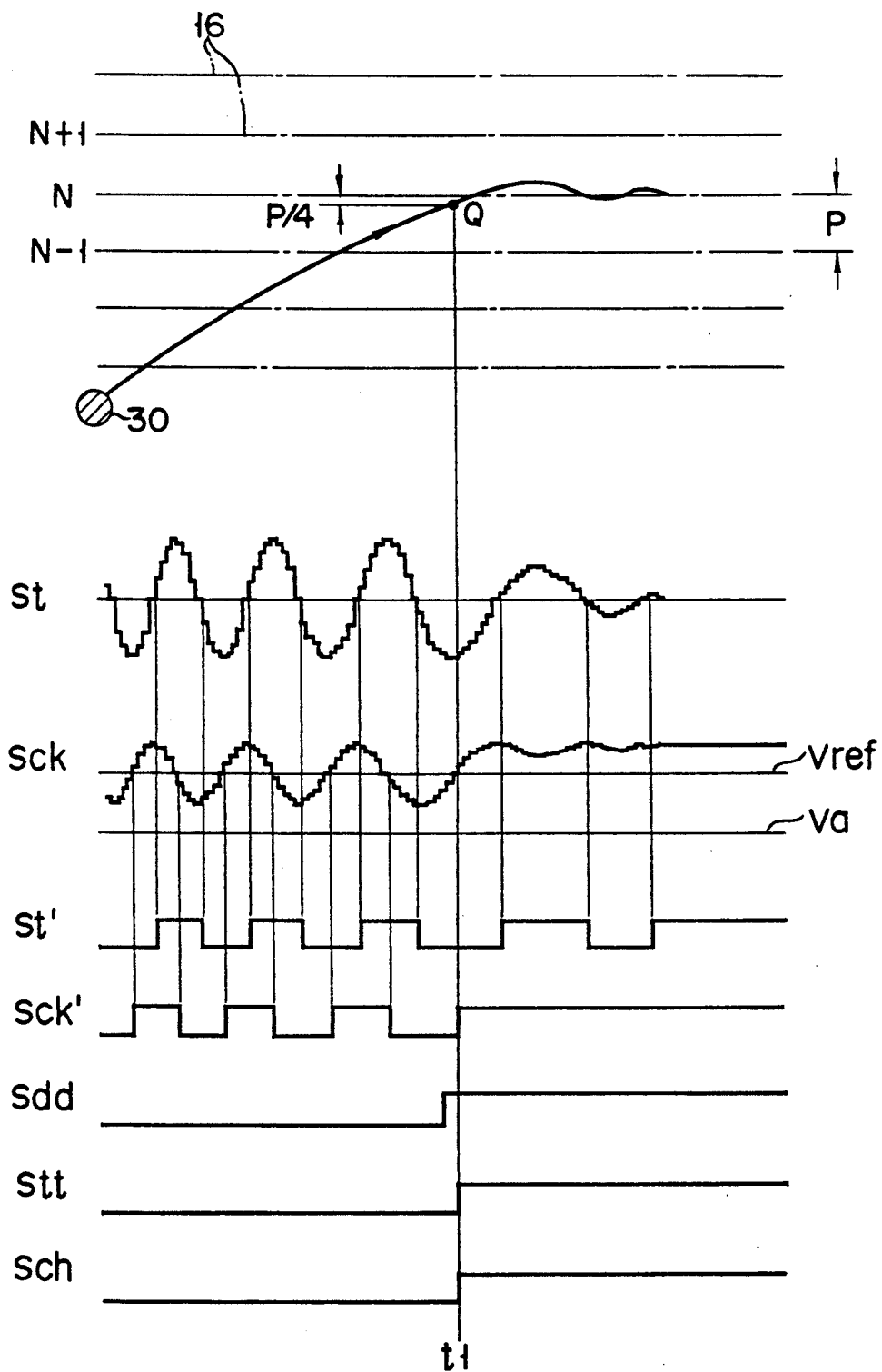
FIG. 23 is a diagram showing waveforms of main signals generated in main parts of a track access control section shown in FIG. 21 in direct track accessing in the same time scale.

As shown in FIG. 23, when the beam spot 30 approaches a target track N on the rotating sample-servo formatted optical disk 12, the amplifier 458 produces a rate error signal Sve corresponding to a difference between the reference velocity signal Sv0 and the velocity detection signal Sv. The signal Sve is supplied to the gain phase compensator 460. Thereafter, the linear motor 430 is rate-controlled in response to a velocity control switching signal Sch from the controller 450 in substantially the same manner as that of an operation in circuits 310, 318, 320, 322, and 330 in the above embodiment shown in FIG. 13. With such a velocity (rate) control operation, when it is detected by the detector 454 that the beam spot 30 reaches the target track N, the detector 454 supplies a signal Sdd representing the above fact to the track capture timing generator 456.

After the track capture timing generator 456 receives the signal Sdd representing that the number of residual tracks is "0", the first leading edge of a pulse change (time t1 in FIG. 22) of the binary clock pit detection signal Sck' input therein is detected. At this time, it is detected that the moving beam spot 30 is positioned at a point Q (see FIG. 23) before the target track N by ¼ the track pitch. The circuit 456 supplies the capture timing signal Stt to the controller 450 in synchronism with the detection timing. The controller 450 supplies the mode switching signal Sch to the switches 426 and 432 in response to the signal Stt. Therefore, a mode is switched from the velocity control mode to the tracking-servo control mode in the same manner as in the above embodiment in FIG. 13, and the beam spot 30 keeps tracing on the target track N.

With such a direct track accessing technique, while the beam spot 30 moves toward the target track N at a relatively low speed during an initial period of the velocity control mode, an actual moving direction of the beam spot 30 is detected by phase comparison between the binary tracking error signal St' and the binary clock pit detection signal Sck'. When the beam spot 30 reaches the position Q (see FIG. 23) before the target track by P/4 during the final period of the velocity control mode (t1), the control mode is switched from the velocity control mode to the tracking-servo control mode at a slightly early timing, thus starting track capture of the beam spot 30. Therefore, high-speed and high-accuracy direct track accessing can be realized, as in the embodiment shown in FIG. 13. Note that a voltage level Va in FIG. 23 represents a total reflection level of the beam spot 30.

Figure 24:
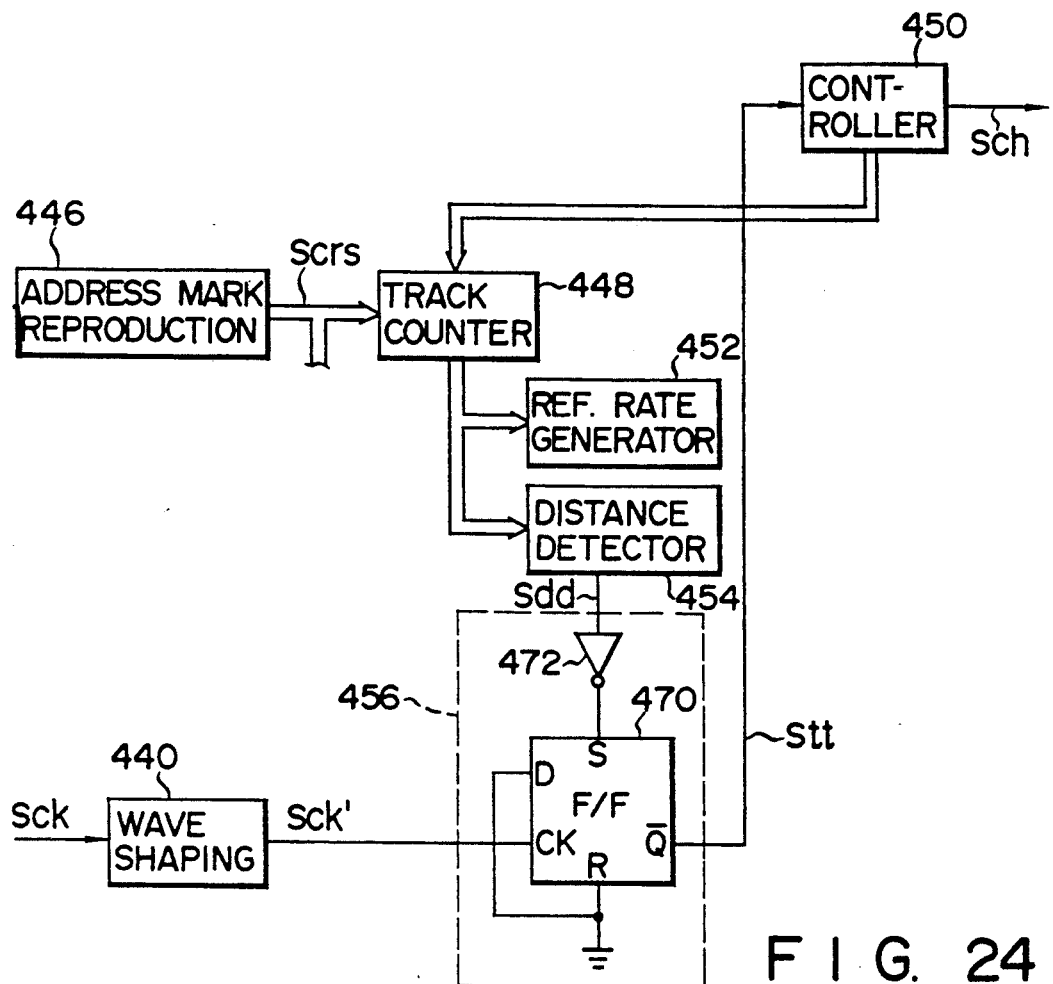
FIG. 24 is a block diagram showing an internal arrangement of a distance detection circuit arranged in the track access control section shown in FIG. 21.

As shown in FIG. 24, the track capture timing generator 456 includes a D type flip-flop circuit 470 and an inverter 472. The flip-flop 470 receives the binary clock pit detection signal Sck' at the clock input thereof. A data input D of the flip-flop 470 is connected to a reset input R which is grounded. The flip-flop 470 is connected to the controller 450 at an inverted output $\overline{Q}$ thereof. The inverter 472 inverts the detection signal Sdd supplied thereto from the detector 454; and the inverted signal is supplied to a set input S of the flip-flop 470.

Figure 25:
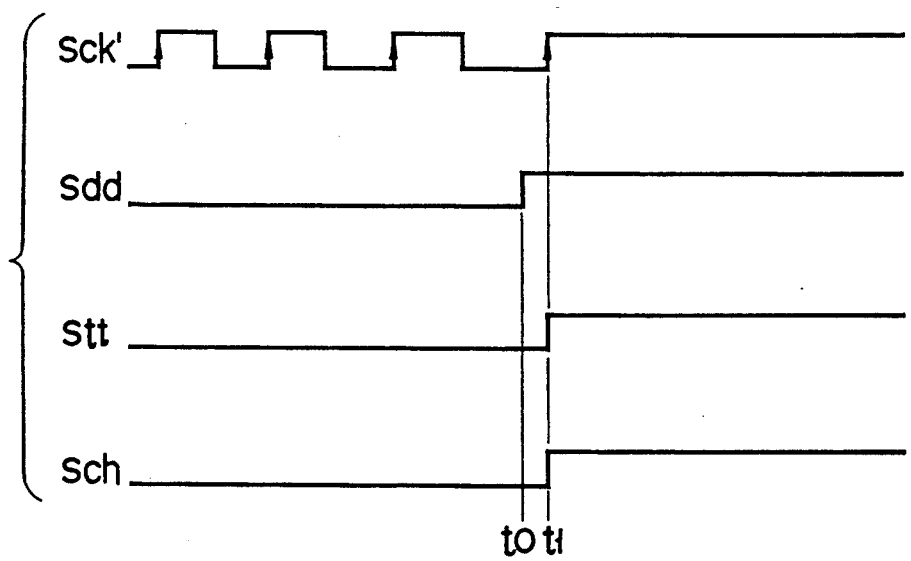
FIG. 25 is a diagram showing waveforms of main signals generated in main parts of the distance detection circuit shown in FIG. 24 in the same time scale.

The flip-flop 470 is set at "L" level at the inputs D and R thereof. The flip-flop 470 produces an inverted output signal set at "L" level before the beam spot 30 enters a distance range of ±P/4 ("P" is a track pitch) with respect to the central line of the target track N, as shown in FIG. 25. The residual track detection signal Sdd changes to have "H" level at time t0. At this time, the flip-flop 470 is set in a clock waiting state. Thereafter, when the beam spot 30 set at "0" enters a distance range of ±P/4 with respect to the central line of the target track N (t1 in FIG. 25), the binary clock pit detection signal Sck' is shifted from "L" level to "H" level. At this time, the flip-flop 470 supplies the inverted output signal to the controller 450 as the velocity control switching signal Sch. The controller produces the control mode switching signal Sch in response to a level change in signal Stt. With such a circuit arrangement, P/4 distance upstream positioning detection of the beam spot 30 can be executed with high precision.

As has been evaluated in the description of the embodiment shown in FIG. 13, the embodiment in FIG. 24 can be modified such that the track capture starting point is not limited to the P/4 upstream position Q, and that the track capture is started at a position which is closer to the target track N. In this case, as shown in FIG. 26, a track capture timing generation circuit 500 includes an inverter 502, a monostable multivibrator 504, and a D type flip-flop circuit 506. The monostable multivibrator 504 produces a delay signal Sdy for controlling time t2 delayed from the time t1, at which the beam spot 30 reaches a position before the target track N by P/4, by a previously selected period (e.g., a time period corresponding to P/8).

Figure 27:
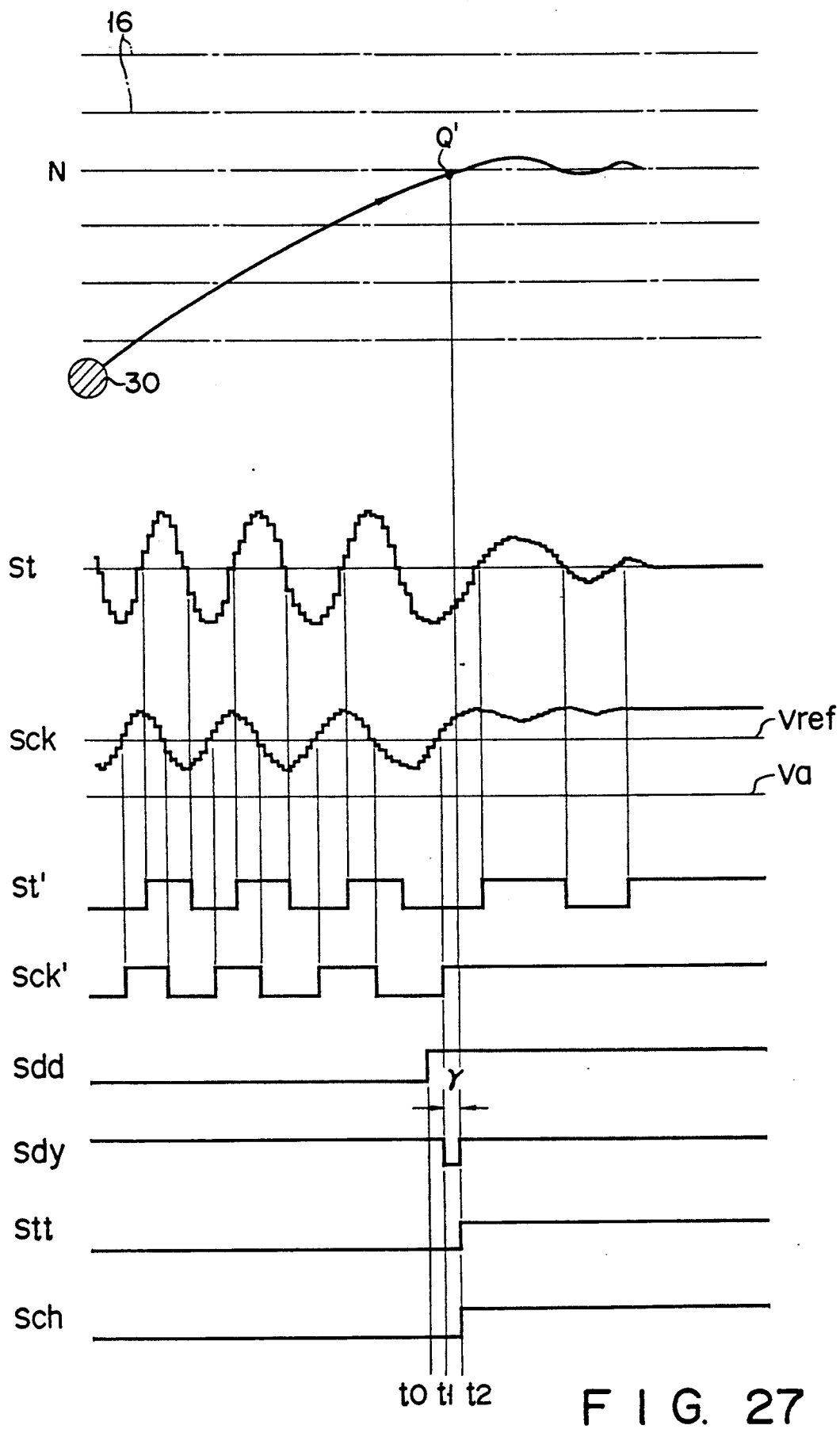
FIG. 27 is a diagram showing waveforms of main signals generated in main parts of the modification in FIG. 26 in the same time scale.

More specifically, as shown in FIG. 27, the multivibrator 504 produces a pulse signal which is enabled at time t2 delayed from time t1, at which the binary clock pit detection signal Sck' is enabled, by delay time $\tau$ after the residual track detection signal Sdd is changed to have "H" level at time t0. In this embodiment, for example, track capture is started when the beam spot 30 reaches a position Q' before the target track N by P/8. Therefore, the delay time $\gamma$ is set to be a time length required to move the beam spot 30 by P/8. If the switching is performed after the beam spot 30 further approaches the target track N, the delay time may be changed. A beam-transmission type optical disk may also be used in place of the aforementioned beam-reflection type optical disk.

What is claimed is:

1. An optical disk apparatus for a rotatable optical disk which is formatted to have in a selected region of each track defined thereon, a clock pit positioned at a center of a corresponding track and first and second wobbled pits respectively formed on both sides of the center of the corresponding track, comprising:
   (a) light-emitting means for emitting a light beam focused, by a focusing means, on the optical disk as a spot which is movable across the tracks on the optical disk;
   (b) photodetector means for receiving input light of the light beam reflected from the optical disk to produce a light detection signal representing an intensity of light reflected from the clock pits and the first and second wobbled pits;
   (c) clock detecting means, connected to said photodetector means, for detecting an intensity variation of the light beam reflected from the optical disk as the spot crosses the clock pits using the light detection signal, thereby producing a clock pit detection signal;
   (d) tracking error detecting means, connected to said photodetector means, for detecting an intensity variation of the light beam reflected from the optical disk as the spot crosses the first and second wobbled pits using the light detection signal, thereby producing a tracking error signal representing a resultant intensity difference; and
   (e) determining means, connected to said clock detecting means and said tracking error detecting means, for comparing a phase of the clock pit detection signal with a phase of the tracking error signal thereby producing a phase comparison result, and for using the phase comparison result to determine a direction in which the spot crosses some of the tracks on the optical disk.

2. The apparatus according to claim 1, wherein said tracking error signal is at a level of one of an "H" level and an "L" level, and wherein said determining means determines whether the spot crosses a certain track inwardly or outwardly by detecting whether the tracking error signal is changed to the "H" or "L" level when a level of the clock pit detection signal is changed.

3. The apparatus according to claim 2, wherein said determining means includes a flip-flop circuit.

4. The apparatus according to claim 2, wherein said determining means includes:
first monostable multivibrator means for receiving the tracking error signal and producing an output pulse signal;
inverter means for receiving the tracking error signal to produce an inverted tracking error signal;
second monostable multivibrator means for receiving the inverted tracking error signal and producing an output pulse signal; and
logic circuit means for determining the direction in which the beam spot crosses some of the tracks on said optical disk in response to the output pulse signals from said first and second monostable multivibrator means.

5. The apparatus according to claim 2, further comprising:
(f) counter means, connected to said determining means, for counting the number of tracks through which the spot crosses in a same direction.

6. The apparatus according to claim 5, wherein said counter means increases a count value when the spot crosses the tracks in the same direction, and decreases the count value when the spot crosses the tracks in an opposite direction.

7. The apparatus according to claim 5, wherein said tracking error signal is at a level of one of an "H" level and an "L" level, and wherein said determining means further includes:
delay means for delaying said determining means from determining the direction in which the spot crosses the tracks by detecting whether the tracking error signal is set at the "H" or "L" level after a preselected delay time has elapsed from a time point at which the clock pit detection signal changes in level.

8. The apparatus according to claim 7, wherein said counter means holds a count value while the preselected delay time elapses in the delay means of said determining means.

9. The apparatus according to claim 8, wherein said determining means includes a monostable multivibrator having a time constant, and wherein the predetermined delay time of said delay means is set to be not more than a value twice the time constant of said monostable multivibrator.

10. The apparatus according to claim 1, wherein the first and second wobbled pits are constant in spacing with respect to the tracks on the optical disk.

11. The apparatus according to claim 1, wherein the first and second wobbled pits are constant distances from respective clock pits.

12. A method of discriminating a crossing direction of a light beam with respect to tracks defined on a rotatable optical disk which is formatted to have in a selected region of each of the tracks a clock pit positioned at a center of a corresponding track and first and second wobbled pits respectively formed on both sides of the center of the corresponding track, comprising the steps of:
(a) receiving input light from the light beam reflected from the optical disk while the light beam is focused and emitted as a spot on the optical disk and is radially moving on the optical disk which is rotating, and producing a light detection signal representing an intensity of light reflected from the clock pits and the first and second wobbled pits;
(b) detecting a change in intensity of the reflected light reflected off of the optical disk as the spot crosses the clock pits using the light detection signal to produce a binary clock pit detection signal;
(c) detecting a change in intensity of the reflected light reflected off of the optical disk as the spot crosses the first and second wobbled pits using the light detection signal to produce a binary tracking error signal representing a resultant intensity difference;
(d) comparing a phase of the clock pit detection signal with a phase of the tracking error signal and creating a phase comparison result; and
(e) determining, using the phase comparison result, a direction in which a beam spot crosses some of the tracks on the optical disk.

13. The method according to claim 12, wherein the determining step determines whether the spot crosses the tracks inwardly or outwardly by detecting whether the binary tracking error signal is set at an "H" or an "L" level when a level of the binary clock pit detection signal is changed.

* * * * *